US008786905B2

(12) United States Patent
Iinuma

(10) Patent No.: US 8,786,905 B2
(45) Date of Patent: Jul. 22, 2014

(54) IMAGE FORMING DEVICE

(71) Applicant: Canon Kabushiki Kaisha, Tokyo (JP)

(72) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/974,107

(22) Filed: Aug. 23, 2013

(65) Prior Publication Data

US 2013/0343792 A1 Dec. 26, 2013

Related U.S. Application Data

(63) Continuation of application No. 12/989,953, filed as application No. PCT/JP2009/005262 on Oct. 8, 2009, now Pat. No. 8,531,724.

(30) Foreign Application Priority Data

Oct. 8, 2008 (JP) ................................ 2008-261930

(51) Int. Cl.
*H04N 1/60* (2006.01)
*G06F 3/12* (2006.01)

(52) U.S. Cl.
USPC ........... 358/1.9; 358/1.13; 399/223; 399/341; 347/5; 347/101; 347/212

(58) Field of Classification Search
None
See application file for complete search history.

(56) References Cited

U.S. PATENT DOCUMENTS 7,443,521 B2 * 10/2008 Saito et al. .................. 358/1.13
7,463,376 B2 * 12/2008 Bezenek ..................... 358/1.15
7,527,345 B2 5/2009 Fukuda et al.
7,532,350 B2 * 5/2009 Takahashi et al. ........... 358/1.16
8,488,187 B2 * 7/2013 Inagaki et al. ................ 358/1.9

(Continued)

FOREIGN PATENT DOCUMENTS

JP 05-265287 A 10/1993
JP 2005-119279 A 5/2005

(Continued)

OTHER PUBLICATIONS

Japanese Office Action dated Sep. 11, 2012 issued in corresponding application No. 2011-240573.

(Continued)

*Primary Examiner* — Kimberly A Williams
(74) *Attorney, Agent, or Firm* — Carter, DeLuca, Farrell & Schmidt, LLP

(57) ABSTRACT

A problem that setting (setting the kind of a paper or a printout method) for achieving the print effect (gloss effect or matte effect) at a maximum is very complicated and therefore, a manual setting thereof by a user is very difficult. When image data which a user desires to print and a desire for a print effect to transparent form image data are input, the paper type, conversion of the transparent form image data and a printout method for realizing the print effect are automatically set and printed out.

5 Claims, 30 Drawing Sheets

(56) References Cited

U.S. PATENT DOCUMENTS

| | | | | |
|---|---|---|---|---|
| 2004/0211520 | A1* | 10/2004 | Escobedo et al. | 156/368 |
| 2005/0024399 | A1 | 2/2005 | Fukuda et al. | |
| 2005/0141942 | A1 | 6/2005 | Someno | |
| 2005/0169680 | A1 | 8/2005 | Ng et al. | |
| 2006/0133870 | A1* | 6/2006 | Ng et al. | 399/341 |
| 2006/0188301 | A1 | 8/2006 | Ng et al. | |
| 2007/0105034 | A1* | 5/2007 | Chatow et al. | 430/114 |
| 2008/0079978 | A1 | 4/2008 | Horiuchi | |
| 2009/0087221 | A1 | 4/2009 | Masui | |
| 2009/0111037 | A1* | 4/2009 | Evans et al. | 430/30 |
| 2009/0123204 | A1* | 5/2009 | Ng et al. | 399/341 |
| 2011/0222126 | A1 | 9/2011 | Asai et al. | |
| 2013/0279958 | A1* | 10/2013 | Yukie et al. | 399/341 |

FOREIGN PATENT DOCUMENTS

| | | | |
|---|---|---|---|
| JP | 2006-171306 | A | 6/2006 |
| JP | 2007-047403 | A | 2/2007 |
| JP | 2007-052175 | A | 3/2007 |
| JP | 2007-127790 | A | 5/2007 |
| JP | 2008-129547 | A | 6/2008 |
| JP | 2008-139589 | A | 6/2008 |

OTHER PUBLICATIONS

European Search Report issued in corresponding application No. 09819000.2 on Apr. 25, 2013.

* cited by examiner

IMAGE FORMING DEVICE

CROSS REFERENCE TO RELATED APPLICATIONS

This application is a continuation of U.S. patent application Ser. No. 12/989,953, filed Oct. 27, 2010, which is a U.S. National Stage of International Application No. PCT/JP2009/005262 filed on Oct. 8, 2009, which claims priority from Japanese Patent Application No. 2008-261930 filed on Oct. 10, 2008, the disclosures of each of which are hereby incorporated by reference herein in their entirety.

TECHNICAL FIELD

The present invention relates to an image forming device which can automatically perform many complex processes generated for realizing selection of a visual effect at the time of outputting a print using transparent toner.

BACKGROUND ART

Recently a digital printing technology has certainly had an increasing use value in an on-demand print market or a document print market for a small great number of copies. Particularly a full color printing using an electrographic technology is more advantageous in terms of productivity, print costs, easiness of maintenance and the like than the other printing technologies, and therefore, the market of the fell color printing has been rapidly spreading. Among this recent trend, particularly not only the conventional full color printing by the electrographic printing using toner of a four colors of CMYBk but also further, a printing system, of multi colors using specific toner has been focused on, which aims at entering into a specific printing market with on-demand properties and high immediacy. An example of the specific toner includes transparent toner which can absorb convexity and concavity on a surface of a printout document to realize high glossiness, light toner which can restrict a rough surface of a highlighted portion, and the like. Use of the specific toner allows a new added value different from a value of the usual digital printing, making it possible to further expand the world of the digital printing. From the above-mentioned background, a color complex machine (hereinafter, referred to as MFP) using the specific toner has been brought to the market.

Among the specific toner, particularly the transparent toner is proposed to be used for compensating for lack of a glossy feeling which a user feels in regard to a printout document. Patent Document 1 proposes a method in which a plain paper as a non-coated paper is used in a case where a coated paper is not mounted at the time of attempting a printing process onto the coated paper, but transparent toner is used on a portion where the surface is white and is used as an application for enhancing glossiness. Further, Patent Document 2 proposes a method in which transparent ink is used on a location in a photo in which ink is not used to hold uniformity of glossiness in the photo.

However, the use purpose of the transparent toner is to achieve a gloss effect only. The transparent toner is not one to be used only for creating the gloss effect. It is also possible to achieve a matte effect depending on a paper or a printout method to be used. In addition, there is left a problem that setting (setting the kind of a paper or a printout method) for achieving the print effect (gloss effect or matte effect) at a maximum is very complicated and therefore, the manual setting by a user is very difficult.

CITATION LIST

Patent Literature

[PTL 1] Japanese Patent Laid-Open No. 2007-047403
[PTL 2] Japanese Patent Laid-Open No. 2005-119279

SUMMARY OF INVENTION

An image forming device in the present invention comprises first selecting means for selecting a gloss effect creating a glossy feeling to a printout document or a matte effect creating a matte feeling to the printout document in a case of printing an input image on a print paper to obtain the printout document, second selecting means for selecting quality priority for prioritizing a quality of the printout document or speed priority for priori fixing a print speed thereof, first printout, means in which in a case where the matte effect is selected by the first selecting means, toner of four colors of cyan, magenta, yellow and black and transparent toner is used to perform printing on a coated paper for obtaining the printout document by printing the image, and the printing is completed by one-time fixing, second printout means in which in a case where the gloss effect is selected by the first selecting means and the quality priority is selected by the second selecting means, the toner of the four colors of the cyan, magenta, yellow and black is used to perform, printing and fixing on the coated paper for obtaining the printout document by priming the image, and thereafter, further reverse transparent form image data reversing transparent form image data printed using transparent toner among image data constituting the input image are printed and fixed using the transparent toner, and third printout means in which in a case where the gloss effect is selected by the first selecting means and the print speed is prioritized, by the second selecting means, the toner of the four colors of the cyan, magenta, yellow and black and the transparent toner is used to perform, the printing on a plain paper for obtaining the printout document by printing the image, and the printing is completed with one-time fixing.

According to the following explanation. In the present invention, a user can select the prim effect more easily as compared to the conventional technology. Further, the present invention can automatically set a process performed in an image forming device required for realizing the print effect.

Hereinafter, transparent toner is used as the specific toner, but besides, there may be used a specific printing agent having a feature of adding a transparent image, such as transparent ink which can produce the similar effect.

DESCRIPTION OF EMBODIMENTS

Embodiment 1

Figure 1:
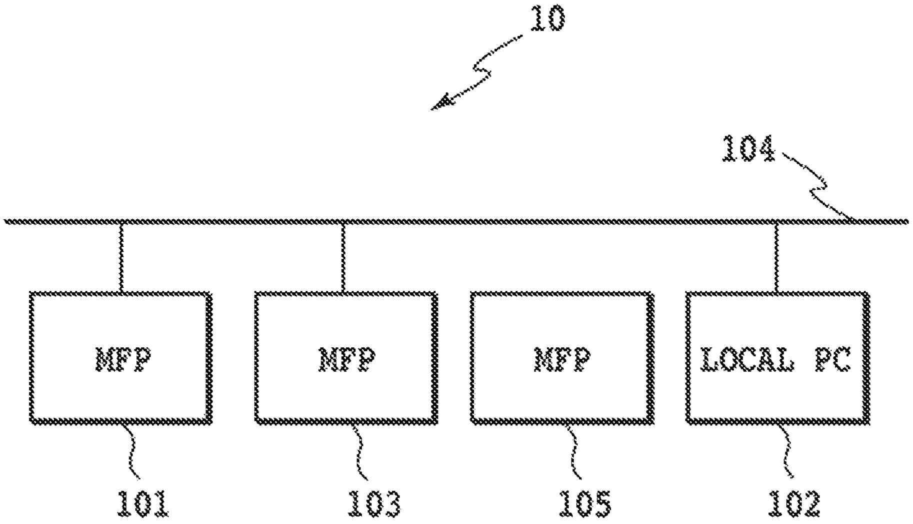
FIG. 1 is a block diagram showing an image processing system, according to the present invention.

FIG. 1 is a block diagram showing an image forming device according to the present invention.

Multi function complex machines (hereinafter, referred to as MFP) 101 and 103 as printing devices and a local PC 102 are connected to LAN 104 built in an office 10. Each MFP 101 and 103 performs an image process to an input image react from an original image. Further, MFP which has read the original image prints out the result of the image process.

In addition, after performing the image process to the original, image read by MFP 101, MFP 103 may print out the result of the image process. Further, a page description language (hereinafter, referred to as PDL) transmitted from the local PC 102 is interpreted, which may be printed out by MFP 101 or 103. MFP 105 is connected to a different LAN.

<MFP>

Figure 2:
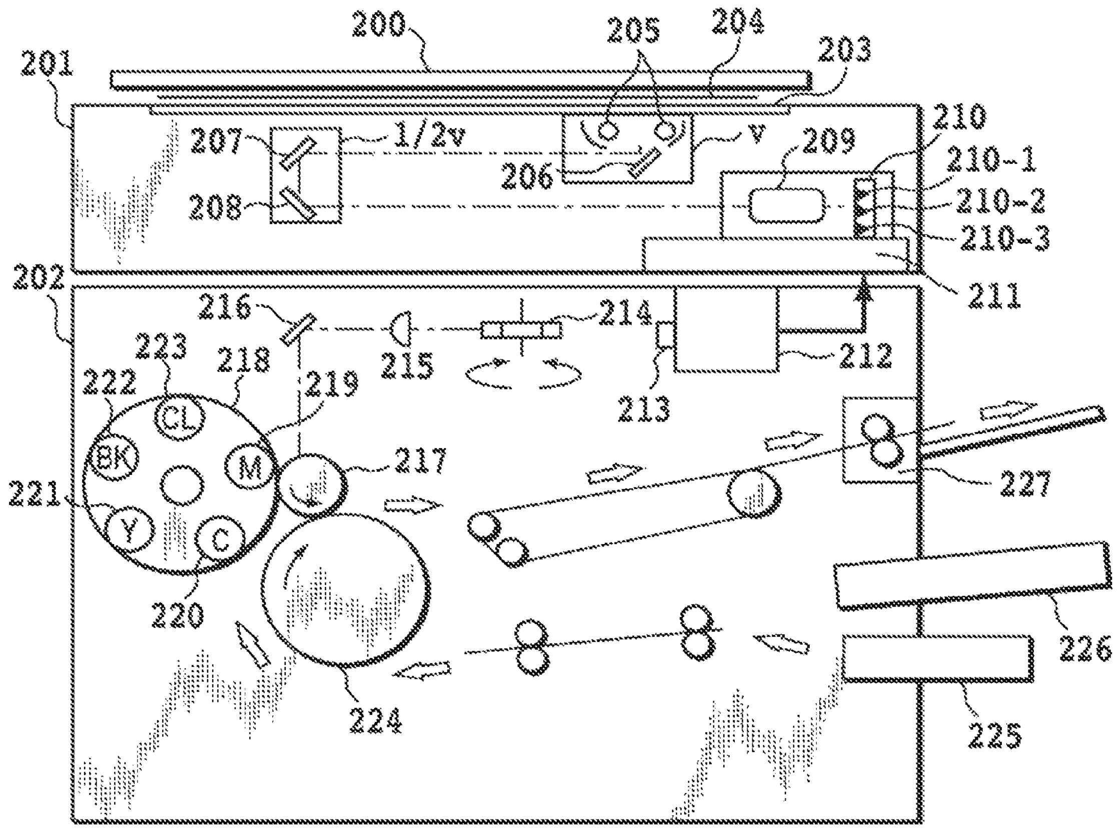
FIG. 2 is a block diagram showing an image forming device according to the present invention.

FIG. 2 is a diagram showing MFP. In FIG. 2, an image scanner (image reading unit) 201 reads an original image and performs a digital signal process. A printer unit 202 prints out an image corresponding to the original image read by the image scanner 201 on a paper in full color.

The image scanner 201 includes a mirror surface pressure plate 200 and an original 204 on an original base glass (hereinafter, referred, to as platen) 203 is radiated by a lamp 205, which is introduced to mirrors 206, 207, and 208. In addition, the radiated light builds up a picture, on a solid-state image sensor (hereinafter, referred to as CCD) 210 with three lines by a lens 209, and three image signals of red (R), green (G) and blue (B) as full color information are transmitted to a data processing device 211. The lamp 205 mechanically moves in a direction vertical to an electrical scan direction (main scan) of a line sensor at a speed of v and the mirrors 207 and 208 mechanically moves in the same way at a speed of ½ v to scan (sub scan) an entire surface of the original. Here, the original 204 is read in both the main scan and the sub scan, for example, with resolution of 600 dpi (dots/inch). The read image signals are accumulated in data accumulating means (not shown) inside the data processing device 211 in a unit of one page of the original.

In the data processing device 211, the image signals accumulated therein are electrically processed in a pixel unit to be decomposed into respective components of magenta (M), cyan (C), yellow (Y) and black (Bk), which will be transmitted to the printer unit 202. In addition, inside the data processing device 211, transparent image data (CL) are generated in a pixel unit, which are likewise transmitted to the printer unit 202.

The transmitted image signals of M, C, Y, Bk and CL are transmitted to a laser driver 212. The laser driver 212 modulates a semiconductor laser 213 in accordance with the transmitted image signal. The laser ray scans through a polygon, mirror 214, an f-θ lens 215 and a mirror 216 on a photosensitive drum 217. Here, both the main scan and the sub scan in the same way as the reading are written in with resolution of 600 dpi (dots/inch).

A rotational developing device 218 includes a magenta developing unit 219, a cyan developing unit 220, a yellow developing unit 221, a black developing unit 222 and a clear (transparent) developing unit 223. The five developing units 219 to 223 alternately contact the photosensitive drum 217 to develop an electrostatic development formed on the photosensitive drum 217 by toner of each color.

A transcriptional drum 224 winds a paper fed from a paper cassette 225 or a paper cassette 226 around the transcriptional drum 224 to transcribe an image developed on the photosensitive drum on the paper.

In this way, after the five colors of CMYBk and clear (transparent) are sequentially transcribed, the paper passes a fixing unit 227 and the toner is fixed on the paper, which thereafter, is discharged.

Further, the paper may be once more subject to the above process without being discharged to be once more printed out, and then may be discharged. An example of the method of once more printing out without being discharged includes a method where in a reverse path used at double-sided printing out, a paper is once more set to a paper feeding step without being reversed.

<Local PC>

Figure 18:
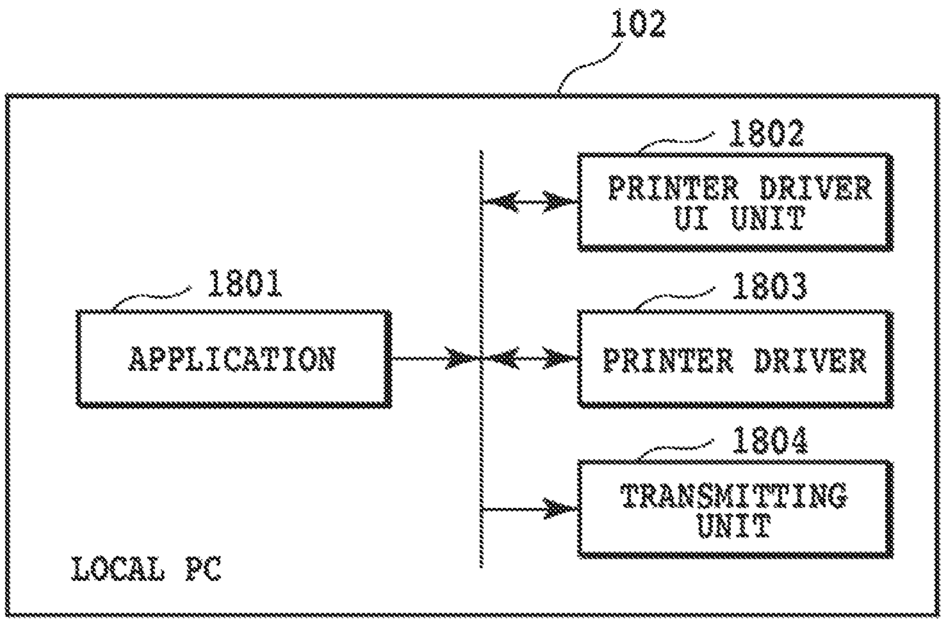
FIG. 18 is a block diagram showing the configuration of a local PC.

FIG. 18 is a diagram showing the configuration of the local PC 102.

Data produced by an application 1801 are explained as an example (hereinafter, referred to as application data). In a case where image data are stored in a memory device inside MFP or printed out by a user, a printer driver UI (user interlace) unit 1802 instructed transmits the instruction to a printer driver 1803. The printer driver 1803 converts the application data into PDL data. PDL language need in PDL data indicates, for example, LIPS or PS. A transmitting unit 1804 transmits the produced PDL data to MFP 101.

<Data Processing Device 211>

Figure 9:
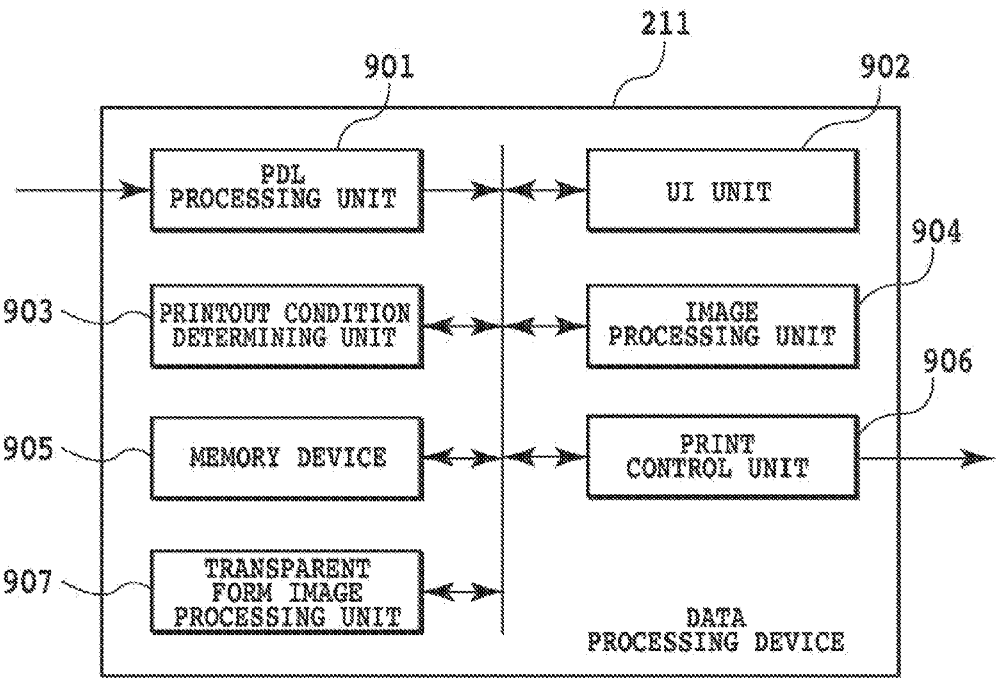
FIG. 9 is a block diagram showing the configuration of a data processing device.

FIG. 9 is a diagram showing the configuration of the data processing device 211 mounted in MFP and the data processing device 211 is configured of a PDL processing unit 901, a UI unit 902, a printout condition determining unit 903, an image processing unit 904, a memory device 905, a printout controlling unit 906 and a transparent form image processing unit 907. The data processing, device and respective units included therein are operated by performing programs stored in the memory device 905 with CPU (not shown).

Figure 10:
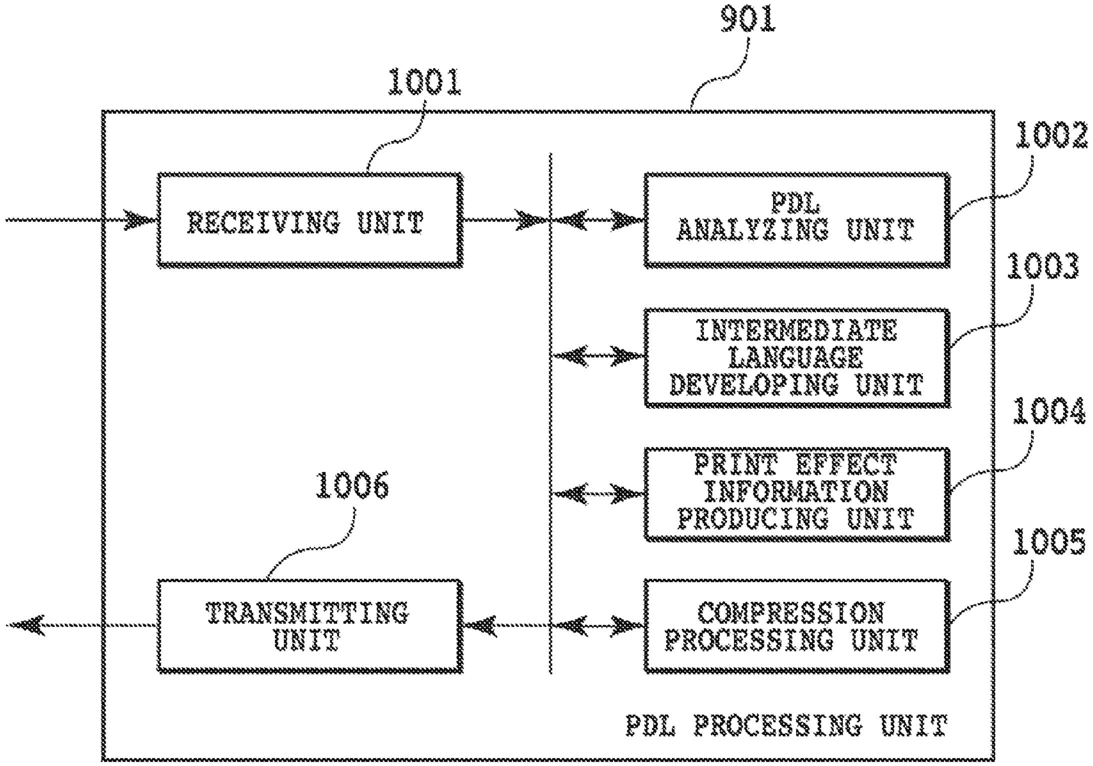
FIG. 10 is a block diagram showing the configuration of a PDL processing unit.

FIG. 10 is a diagram showing the configuration of the PDL processing unit 901 in FIG. 9, which is configured of a receiving unit 1001, a PDL analyzing unit 1002, an intermediate language developing unit 1003, a print effect information producing unit 1004, a compression processing unit 1005 and a transmitting unit 1006.

Figure 11:
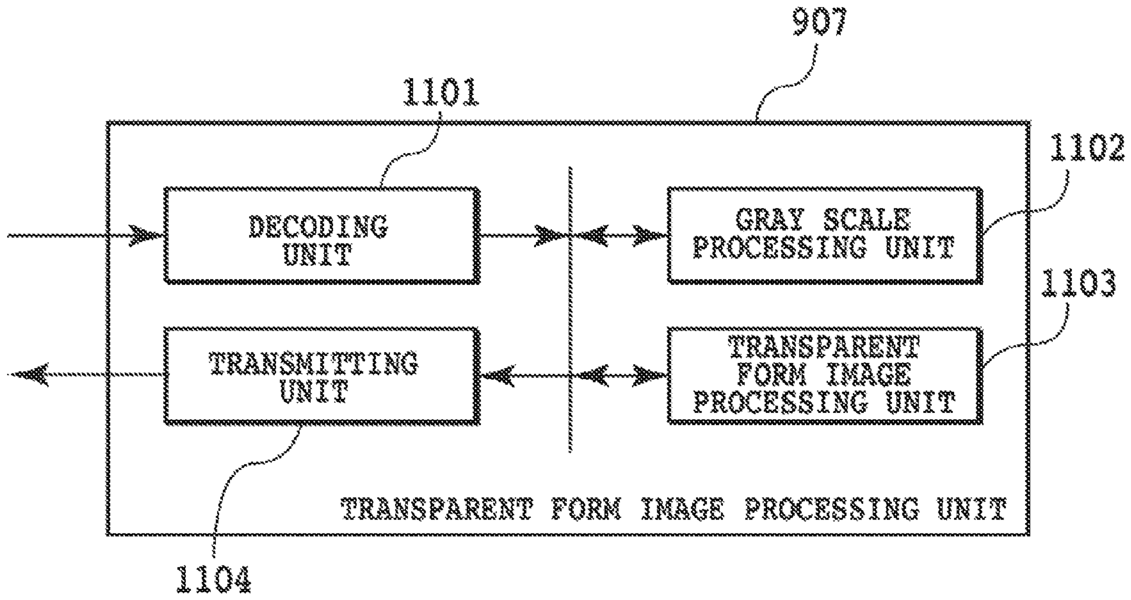
FIG. 11 is a block diagram showing the configuration of a transparent form image processing unit.

FIG. 11 is a diagram showing the configuration of the transparent form image processing unit 907 in FIG. 9, which is configured of an decoding unit 1101, a gray scale processing unit 1102, a binarization processing unit 1103 and a transmitting unit 1104.

Figure 12:
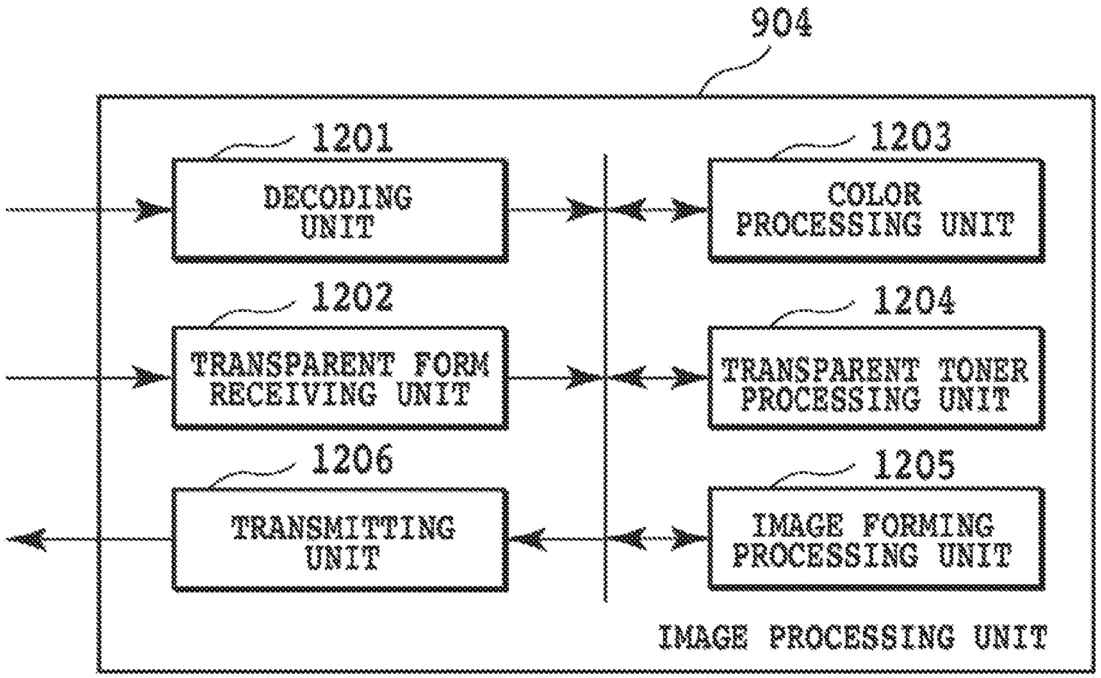
FIG. 12 is a block diagram showing the configuration of an image processing unit.

FIG. 12 is a diagram showing the configuration of the image processing unit 904 in FIG. 9, which is configured of an decoding unit 1201, a transparent form receiving unit 1202, a color processing unit 1203, a transparent toner processing, unit 1204, an image forming processing unit 1205 and a transmitting unit 1206.

<One-Path Print-Out Process>

Figure 3:
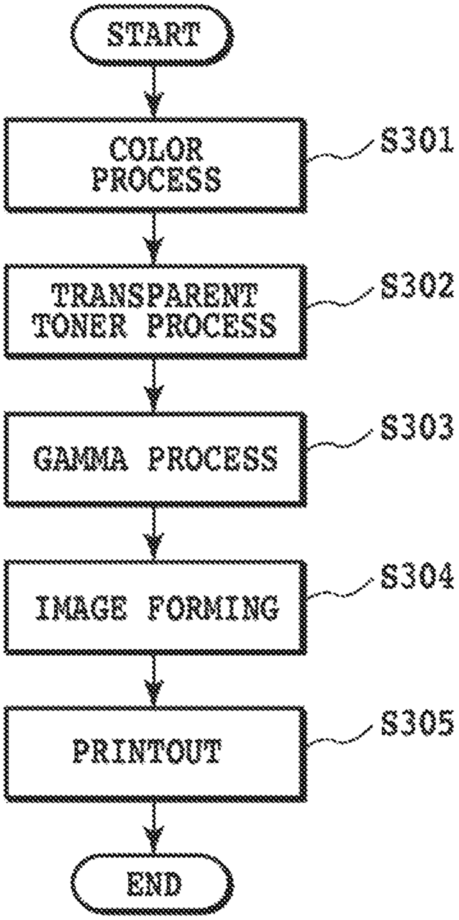
FIG. 3 is a flow chart in regard to an image process for a one-pass print-out process using transparent toner.

FIG. 3 is a diagram showing a flow chart in regard to an image process and a one-path print-out process performed by the data processing device 211. The procedure shown in this flowchart is stored in the memory device 905 in the data processing device 211 and is carried out by CPU (not shown).

In the color process at step S301, R, G and B signals from the local PC 102 or MFP 101 and 103 are converted into CMYBk signals at the color processing unit 1203 by the image processing unit 904. The conversion into the CMYBk signal is carried out by a matrix calculation as shown in Expression (1).

$$\begin{pmatrix} C \\ M \\ Y \\ Bk \end{pmatrix} = \begin{pmatrix} A1 & A2 & A3 \\ A4 & A5 & A6 \\ A7 & A8 & A9 \\ A10 & A11 & A12 \end{pmatrix} \begin{pmatrix} R \\ G \\ B \end{pmatrix} \tag{1}$$

In addition, the local PC 102 may transmit the CMYBk signals, but in this case, the color processing unit 1203 performs the concentration adjustment or the like at step S301.

Next, at step S302 the color processing unit 1203 calculates transparent toner components from the CMYBk signals at the transparent toner processing unit 1204. First, a total toner amount of CMYBk is found for each pixel. Here, the total toner amount is a toner amount transcribed on a paper for each pixel by a sum of signal quantities found by combining four colors of CMYBk. The total toner amount is usually expressed as a percentage value of which the single color maximum value is 100%. In a case where the image signal is expressed in the integer number of 8 bits, since the single color maximum value is 255, the total toner amount is determined by multiplying an additional value of CMYBk by 100/255.

For example, assuming that an image signal of 8 bits has a relation of C=80, M=90, Y=140 and Bk=110 in regard to some pixel.

$$\text{Total toner amount}=(C+M+Y+Bk)\times 100/255=167\% \tag{2}$$

A general upper limit value of the total toner amount is usually in the order of 200 to 280% and is determined by an image producing process, but in the present embodiment, a total amount after further forming a transparent toner layer is required to be equal to or less than the upper limit value.

Hero, assuming that the upper limit value of the total toner amount is 240%, a difference between the numeral value in Expression (2) and the upper limit value may be considered as a concentration rate allowable in the transparent toner layer, wherein $$\text{Allowable amount}=240-167=73\%. \tag{3}$$

When the amount of CMYBk and CL (transparent toner) is determined, at step S303 the image processing unit 904 performs a gamma correction process set by MFP 101 for each color at the image forming processing unit 1205.

At step S304, the image forming processing unit 1205 performs an image funning process for each color. The image forming processing includes a screen process or an error diffusion process.

Figure 4:
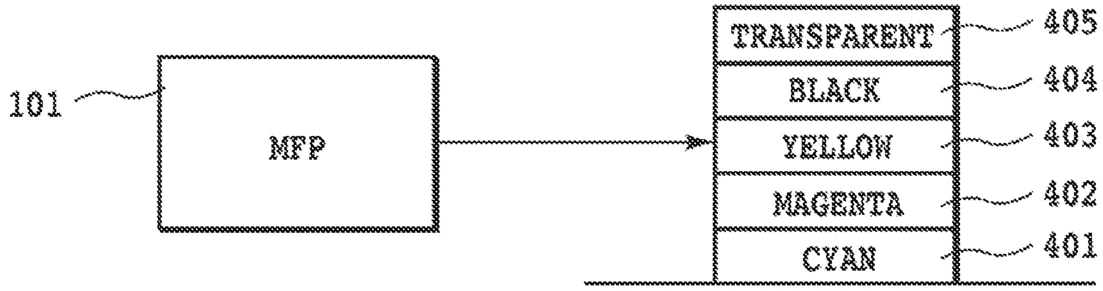
FIG. 4 is a diagram showing an adhesion method of toner at a two-pass print-out process.

Finally at step S305 MFP 101 uses the toner of CMYBk and CL to print out an image. FIG. 4 shows the outline diagram.

That is, a one-path print-out process means a printout method in which the transparent toner amount is calculated from the total toner amount of the four colors of cyan, magenta, yellow and black, and the printing and fixing are performed one time, thus using a regular printout (first print-out) function completing the printout by one process.

The printout method explained above is called "one-path print-out".

<Two-Path Print-Out Process>

Figure 5:
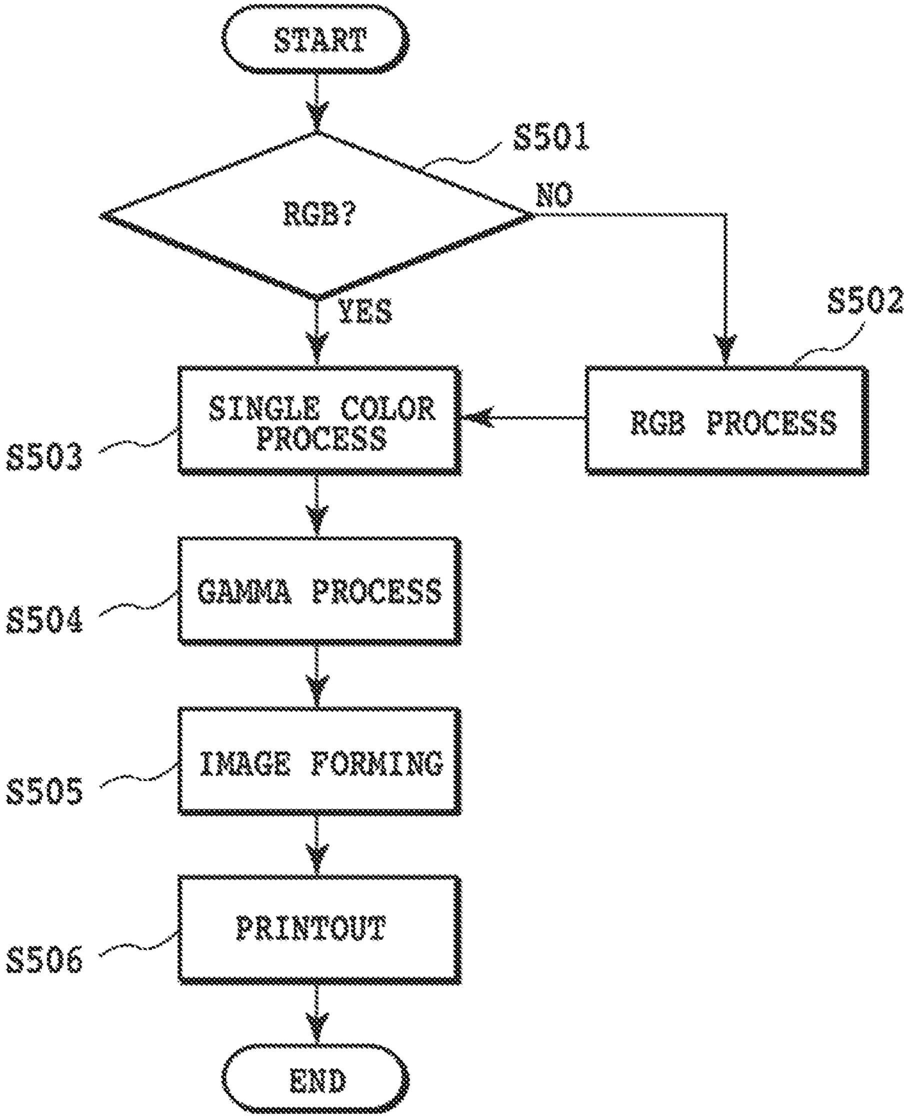
FIG. 5 is a flow chart in regard to an image process for the two-pass print-out process using transparent toner.

FIG. 5 is a flow chart in regard to an image process and a two-path print-out process performed by the data processing device 211.

The procedure shown in this flow chart is stored in the memory device 905 in the data processing device 211 and is performed by CPU (not shown).

At step S501 die image processing unit 904 determines whether input image signals from the local PC 102 or the MFP 101 and 103 are R, G, and B signals or CMYBk signals at the color processing unit 1203. In a case where as a result of the determination, the input image signal is the CMYBk signal, at step S302 the image processing unit 904 converts the CMYBk signal into the R, G and B signal at the color processing unit 1203. The method of the conversion is carried out by the matrix calculation as shown in Expression (4).

$$\begin{pmatrix} R \\ G \\ B \end{pmatrix} = \begin{pmatrix} B1 & B2 & B3 & B4 \\ B5 & B6 & B7 & B8 \\ B9 & B10 & B11 & B12 \end{pmatrix} \begin{pmatrix} C \\ M \\ Y \\ Bk \end{pmatrix} \tag{4}$$

Figure 6:
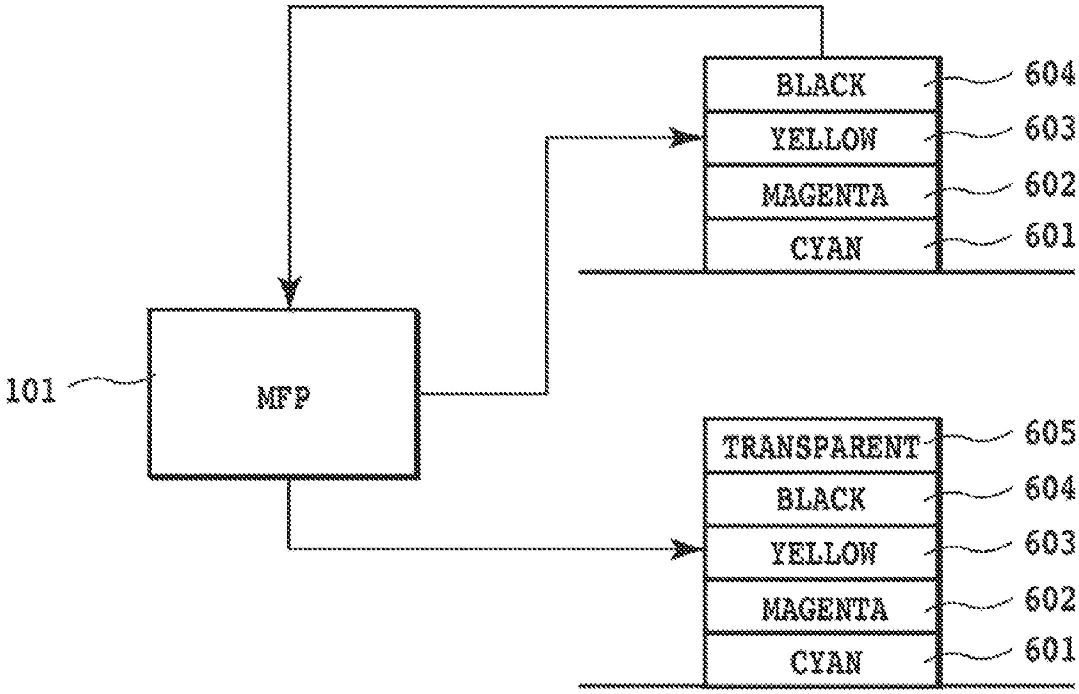
FIG. 6 is a diagram showing an adhesion, method of toner at the two-path print-out process.

Next, at step S503 the color processing unit 1203 replaces the R, G and B signals for one signal of a single color. The method of the conversion is carried out using a calculating expression or the like and the calculating expression is not uniform. The CMYBk signals are converted into the R, G and B signals, which then are replaced by the one signal of the single color, but it is possible to directly replace the CMYBk signals for the one signal of the single color using the well known method. In addition, at step S504 the image processing unit 904 performs a gamma correction process for transparent toner set by the MFP 101 to the signal converted into one signal at the image forming processing unit 1205. Further, at step S505 the image forming processing unit 1205 performs the image forming process. At step S506 MFP 101 prints out an image using toner of CL. The schematic diagram is shown in FIG. 6. MFP 101 first prints cyan 601, magenta 602, yellow 603 and black 604 in that order and performs the printout. Next, a printout document by the CMYBk is set to a paper feeding step of MFP 101. A transparency 605 is printed and printed out on the set printout document.

That is, the two-path print-out process is a printout method using a two-path print-out (second printout) function in which four colors of cyan, magenta, yellow and black (C, M, Y and Bk) are fixed once, and thereafter, transparent toner is printed thereon, thus completing the printout with two processes. Here, a feature of the two-path print-out process by a case compared with the one-path print-out process will be explained. Using the two-path print-out process, a total time required for the printout increases without mentioning. However, in a case of using the one-path print-out process, since a print amount of the transparent toner is a difference amount found by subtracting the CMYBk amount from the upper limit value of the total toner amount, an amount for printing the transparent toner may be zero according to the calculation. For example, this is a case where a total toner amount of CMYBk exceeds a total toner amount allowed by a printout device. In this case, even if a user intends to print the transparent toner, a visual effect by the transparent toner can not be obtained.

However, in a case of using the two-path print-out process, after the CMYBk toner is fixed, the transparent toner is printed and fixed. In this case, the transparent toner can be printed in an adhesion amount of 100% as the maximum value of a single color. As a result, since the toner adhesion amount is not restricted in the two-path print-out process, the transparent toner of the instructed adhesion amount can be printed to restrict reduction of the visual effect.

The printout method explained above is called “two-path print-out” hereinafter.

<Print Effect by Transparent Toner>

Figure 30:
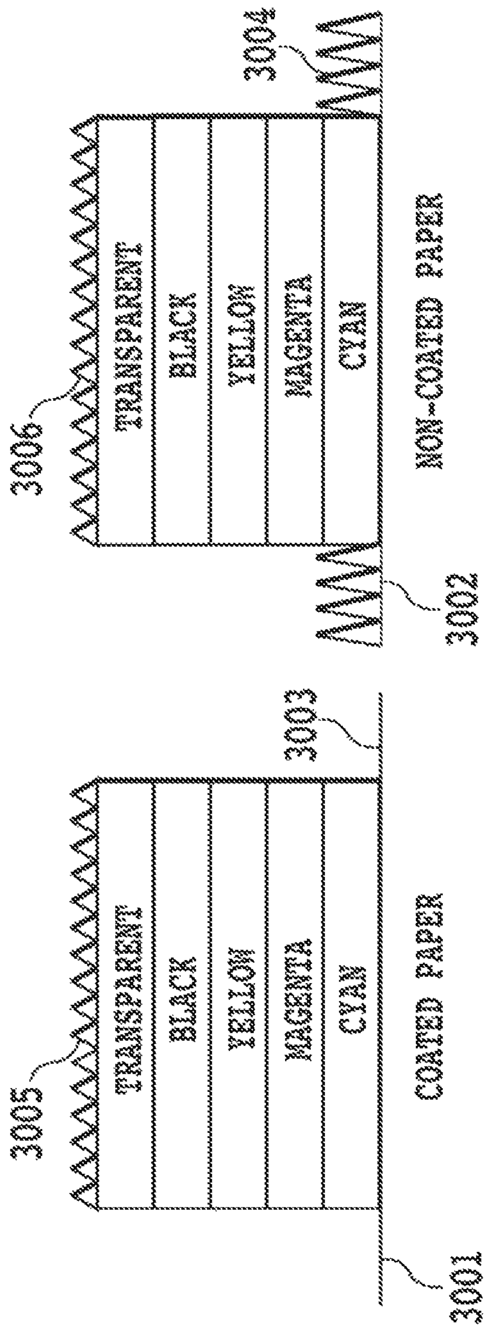
FIG. 30 is a diagram showing a cross section, after forming an image at the one-path print-out process.

FIG. 30 is a diagram showing a surface of transparent toner at the time of usually printing out.

Figure 16:
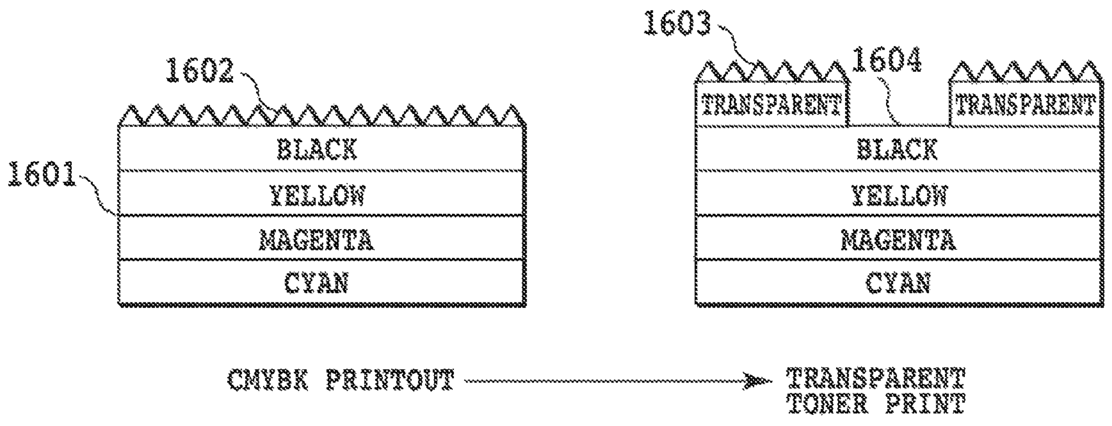
FIG. 16 is a diagram showing a cross section after forming an image at the two-path print-out process.

FIG. 16 is a diagram showing a surface of transparent toner at a two-path print-out process.

The print effect (gloss or matte) depends on a difference in surface properties between a paper and transparent toner and a difference in surface properties between transparent toner and toner already printed. First, in regard to a paper, there is a difference in surface between a coated paper 3001 and a non-coated paper 3002 as a plain paper in FIG. 30. Since a surface 3003 of the coated paper 3001 is coated, it has no concavity and convexity. On the other hand, a surface 3004 of the non-coated paper 3002 has concavity and convexity due to an influence of paper fabric. In a case of performing a one-path print-out process using the transparent toner on the paper, even if surfaces 3005 and 3006 of the paper to which the transparent toner adheres pass through the fixing unit 227 of MFP 101, more or less concavity and convexity remain thereon. In a case of performing the one-path print-out process using the transparent toner on the coated paper 3001, since the surface 3003 of the coated paper 3001 has no concavity and convexity and the surface 3005 of the transparent toner has concavity and convexity, a matte effect occurs on the printed location (that is, the surface 3005 of the transparent toner). On the other hand, in a case of performing the one-path print-out process using the transparent toner on the non-coated paper 3002, both the surfaces of the paper and the transparent toner have concavity and convexity. However, in general, since the concavity and convexity on the surface of the non-coated paper 3002 are larger that those on the surface 3006 of the transparent toner, a gloss effect occurs on the printed location (that is, the surface 3006 of the transparent toner).

Next, in a case of performing a two-path print-out process, in regard to a printout document 1601 by four colors of CMYBk in FIG. 16, more or less concavity and convexity remain, on a surface 1602 of the toner in the same way as at the one-path prim-out process. At the time of printing the transparent toner on a part of the surface of the printout document 1601, more or less concavity and convexity remain on a surface 1603 on which the transparent toner is printed. In contrast, since a surface 1604 on which four colors of CMYBk are printed passes through the fixing unit 227 twice, the concavity and convexity on the surface 1602 are made smooth as the surface 1604. Therefore, in a case of the two-path print-out process, when the transparent toner is printed on a location on which the toner of CMYBk is already printed (that is, surface 1603 of the toner). Use matte effect occurs.

<Transparent Form Image Data>

Figure 7:
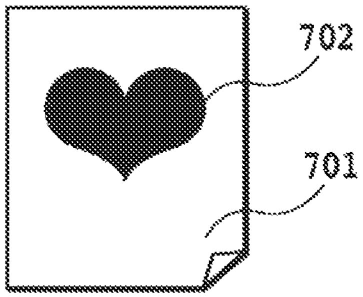
FIG. 7 is a diagram showing an example of transparent form image data.
Figure 8:
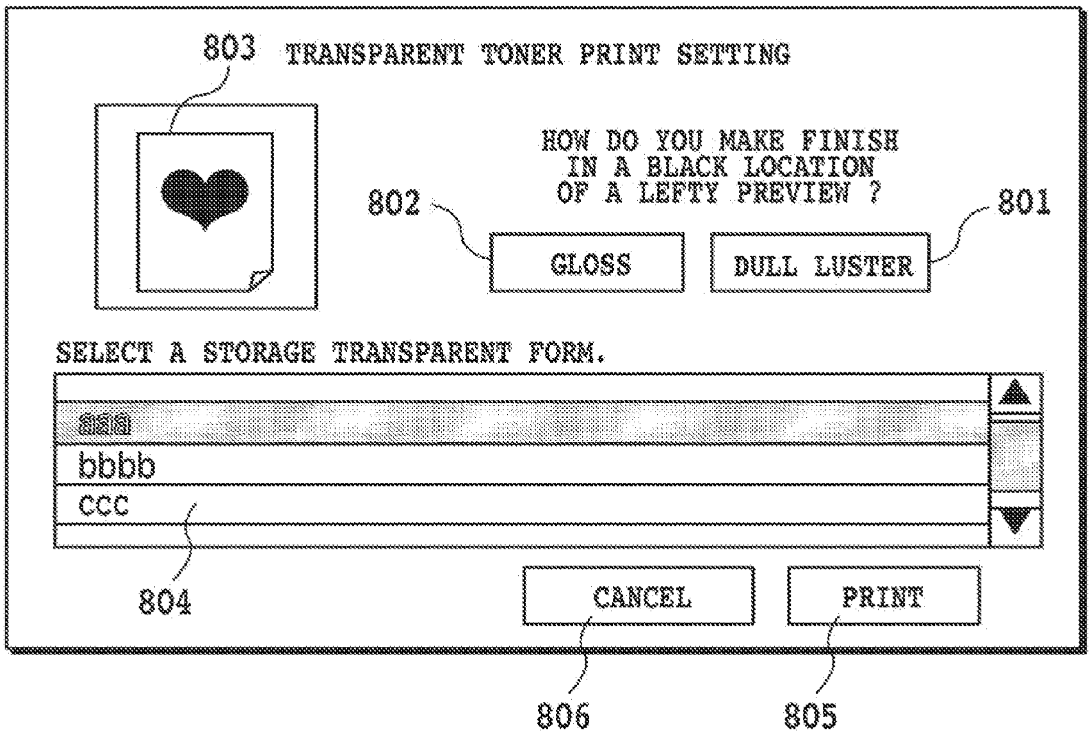
FIG. 8 is a diagram showing an example displayed on an UI screen.

FIG. 7 shows an example of transparent form image data. FIG. 8 shows an example of an image shown on the local PC screen.

Transparent form image data 701 are stored in binary image data, and a location 702 of a logical value “1” shows a position subject to a visual effect generated at the time of using the transparent toner. Bottoms 801 and 802 instruct to a print effect information producing unit 1004 of the PDL processing unit 901 which effect a user desires in the location 702 of the logical value “1” in the form image 701 shown in a preview 803.

<Transparent Form Image Registration>

In regard to compression and decode described in the present specification, a well known technology as JPEG is to be used.

The image processing unit 904 uses transparent form image data at the time of printing transparent toner at the transparent toner processing unit 1204. The memory device 905 registers an image showing a location for creating the effect by the transparent toner as transparent form image data.

When the local PC 102 instructs the transparent form image registration from the driver UI screen (not shown), the PDL processing unit 901 receives PDL data transmitted from the local PC 102, at the receiving unit 1001. In addition, the image data received for being registered as the transparent form image data are not only data received from the local PC 102, but also may be based on image data obtained from an image scanned by the image scanner 201 of MFP.

Figure 13:
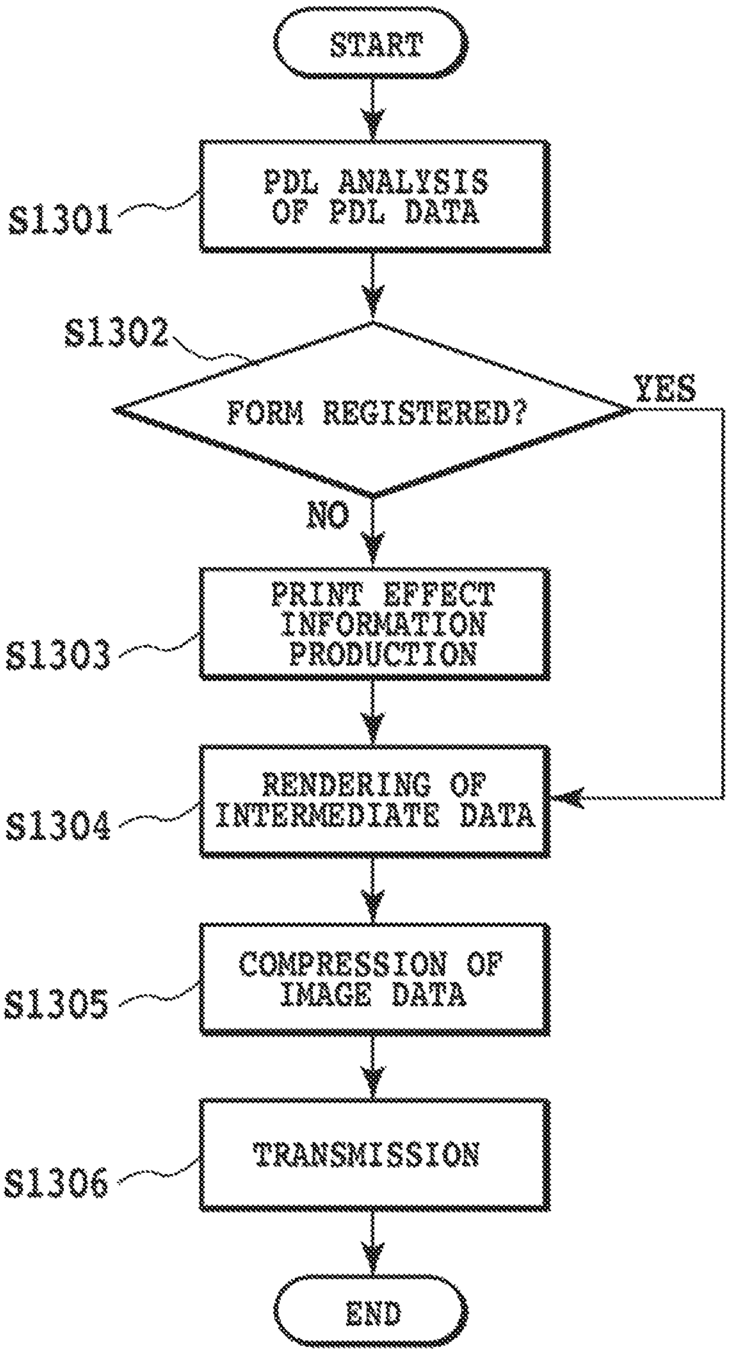
FIG. 13 is a flow chart showing an outline of the present invention.

An operation flow of the PDL processing unit 901 will be explained with reference to FIG. 13.

At step S1301, the PDL analyzing unit 1002 analyses the PDL data to generate intermediate data. In a case of registering a transparent form image at step S1302, step S1303 is skipped, and at step S1304, the intermediate language developing unit 1003 performs rendering to the intermediate data to generate image data. At step S1305, the compression processing unit 1005 compresses the image data to generate compression data. At step S1306, the transmitting unit 1006 transmits the compression data toward the decoding unit 1101 in the transparent form image processing unit 907.

Figure 14:
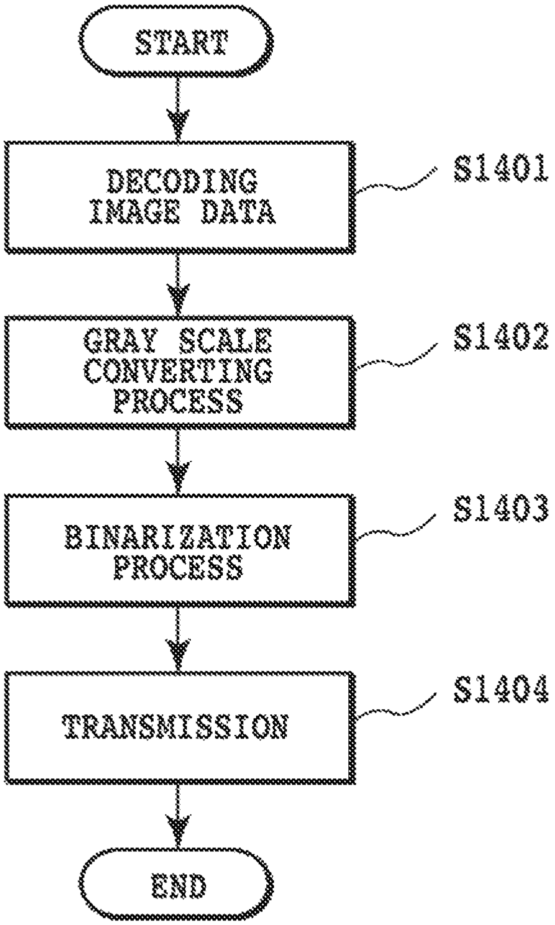
FIG. 14 is a flow chart showing an outline of the present invention.

Next, an operation flow of the transparent form image processing unit 907 will be explained with reference to FIG. 14.

First, at step S1401, the decoding unit 1101 decodes the received compression data. At step S1402, the gray scale processing unit 1102 converts fee decoded image data into data of the gray scale. An example of the conversion method includes a case where in a case of being input in RGB, the data are converted into YUV signals, and only the Y signal is used as a gray scale signal, but is not limited thereto. At step S1403, the binarization processing unit 1103 converts the image signal converted into the gray-scale into binary image data. An example of the conversion method includes a method in which a threshold value is set, and when, a gray scale signal value is larger that the threshold value, the data is "1" and when the gray scale signal value is smaller that the threshold value, the data is "0", thus generating the binary image data. At step S1404, the transmitting unit 1103 transmits the binary image data to the memory device 905.

The memory device 905 receives the binary image data, which is stored as the transparent form image data therein.

<Printing Using Transparent Toner>

The transparent form image data stored in the memory device 905 are used to realize the printing using transparent toner.

When the printer driver 1803 on the local PC 102 instructs the printing using the transparent form image data, the printer driver UI unit 1802 displays FIG. 8 on the screen. First, the primer driver UI unit 1802 selects the transparent form image data to be used at printing out from many stored transparent form image data at a selection area 804. Then, the printer driver UI unit 1802 displays the preview 803 on the screen, making it possible to confirm the binarized transparent form image data. The printer driver UI unit 1802 determines hie print effect to a portion (location of logical value "1" in the binary image data) displayed on the preview 803. The printer driver UI unit 1802 transmits to the printer driver 1803 an instruction from the button 801 in a case of producing a matte effect and an instruction from the button 802 in a case of producing a gloss effect, according to an instruction of a button 805. Finally the transmitting unit 1804 transmits the PDL data generated, in the printer driver 1803. An instruction of a button 806 instructs cancellation.

With the instruction from the button 805, the receiving unit 1001 in the PDL processing unit 901 receives PDL data from the local PC 102. The process flow in the PDL processing unit 901 is almost the same as at the time of registering the transparent form image. With the difference amount, at step S1303, the PDL analysing unit 1002 analyses whether die PDL data require the matte effect or the gloss effect to produce the print effect information. At step S1306, the transmitting unit 1006 transmits the print effect information to the printout condition determining unit 903. At step S1304, the transmitting unit 1006 transmits the compressed image data to the image processing unit 904.

An operation flow of the printout condition determining unit 903 will be explained with reference to FIG. 15.

At step S1501, the printout condition determining unit 903 determines whether the print effect information is the matte effect or the gloss effect. In a case where the matte effect is selected, the process goes to step S1505. That is, the printout condition determining unit 903 determines to adopt a one-path print-out process as the printing method and use a coated paper as the paper type. In addition, the determination information is generated based upon this result. Then die process goes to step S1506, wherein the determination, information is transmitted to the image processing unit 904. Next, in a case where the gloss effect is selected, the process goes to step S1502. That is, the printout condition determining unit 903 determines whether selection of the priority matter in advance set at MFP 101 is print quality priority or print speed priority.

In a case where the print speed priority is selected, first the one-path print-out process is prioritized rather than the two-path print-out process requiring more printing process time. In most cases, a coated paper requires more time for transportation as compared to a non-coated paper. Based upon these matters, in a case where the print speed is prioritized, the process goes to step S1503, wherein the printout condition determining unit 903 determines to adopt the one-path print-out process as the printing method and use the non-coated paper as the paper type. In addition, the determination information is generated based upon this result. Then the process goes to step S1506, wherein the determination information is transmitted to the image processing unit 904.

Finally in a case where the print quality priority is selected, first, there is adopted the two-path print-out process in which a transparent toner amount is not limited by an adhesion amount of toner as compared to the one-path print-out process. As described above, an amount of the transparent toner required for producing the gloss effect may not adhere due to the toner adhesion amount limit. In this case, regardless of aiming at the gloss effect, the visual effect is reduced due to the toner adhesion amount limit. Therefore, when the two-path print-out process which is not subject to the limit by the toner adhesion amount is adopted, the reduction of the gloss effect can be avoided. Further, the coated paper can more effectively produce a glossy feeling to a portion requiring the gloss effect.

Therefore, at step S1504, the printout condition determining unit 903 determines to adopt the two-path print-out process as the printing method, use the coated paper as the paper type and reverse the transparent form image data. In addition, the determination information is generated based upon this result. Then the process goes to step S1506, wherein the determination information is transmitted to the image processing unit 904.

Figure 17:
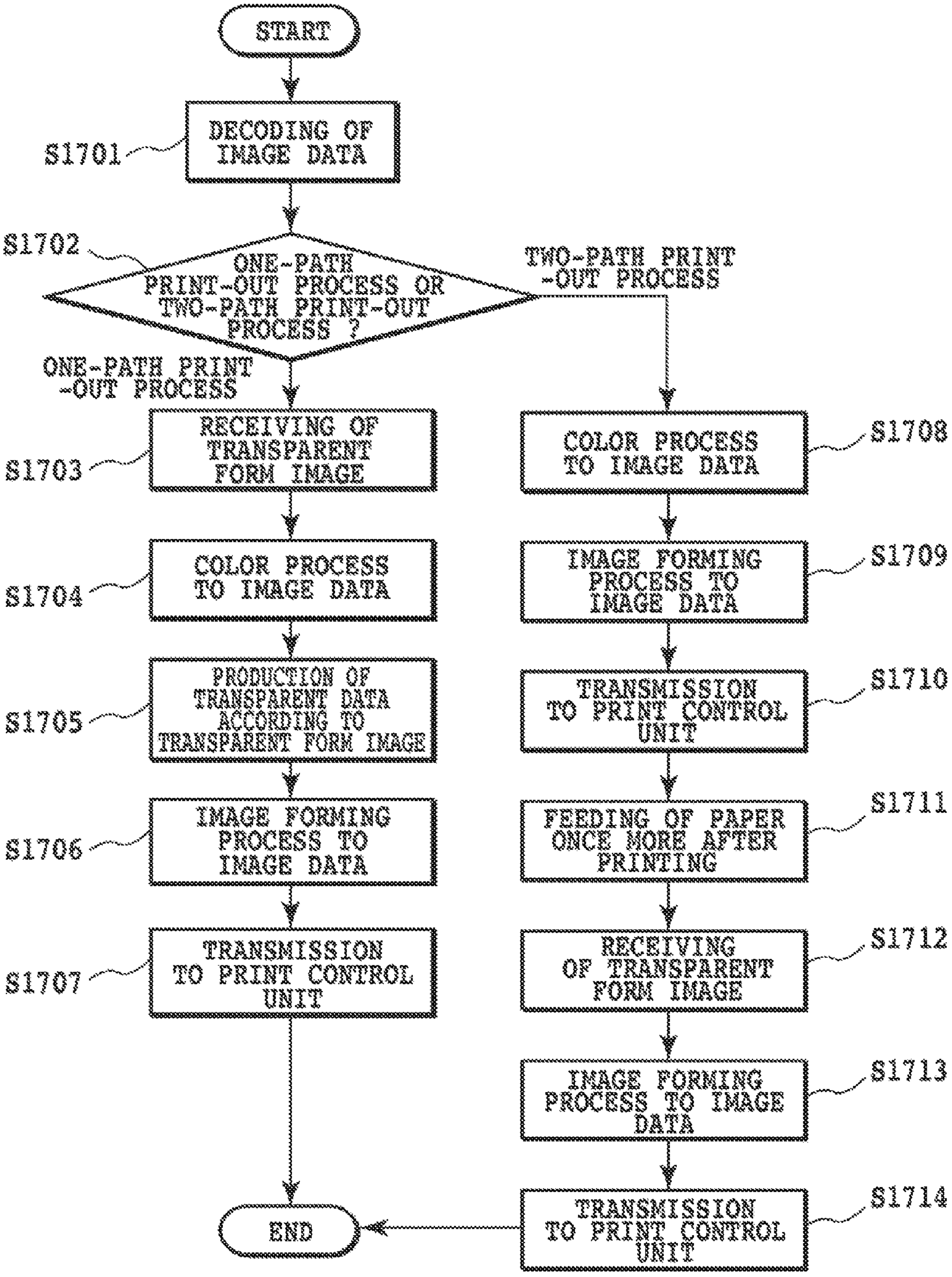
FIG. 17 is a flow chart showing an outline of the present invention.

An operation flow of the image processing unit 904 will be explained with reference to FIG. 17.

The image processing unit 904, at step S1701 decodes the image data received from the decoding unit 1201. At step S1702, the image processing unit 904 determines whether the printing method is the one-path print-out process or the two-path print-out process from the determination information. When, it is determined that the printing method is the one-path print-out process, at step S1703 the transparent form receiving unit 1202 receives transparent form image data from the memory device 905. Further, when the binary image data in the transparent form image data are required to be reversed from the determination information, the reversing work is also performed. At step S1704, in a case where the image data are composed of RGB image data, the color processing unit 1203 converts the RGB image data into CMYBk image data to adjust the concentration by a calculating process or the like. In a case of the CMYBk image data, the concentration is adjusted by the calculating process or the like. At step S1705, the transparent toner processing unit 1204 performs the one-path print-out process to a location of a logical value "1" in the transparent form image data, that is, the binary image data to determine a transparent toner amount. On the other hand, any print-out process is performed in a location of the logical, value "0" in the binary image data to generate image data including a transparent toner plate. At step S1706, the image forming processing unit 1205 performs a gamma correction process set in MFP 101 to each plate (CMYBk and transparency) to perform an image forming process. The method of the image forming process is performed by a screen or error diffusion. At step S1707, the transmitting unit 1206 transmits the image data after the image forming process to the print control unit 906.

At step S1702, in a case where it is determined that the printing method is the two-path print-out process, at step S1708 the color processing unit 1203 performs a color process to the image data. At step S1709, the image forming processing unit 1205 performs the gamma correction process set in MFP to each plate (CMYBk) to perform the image forming process. At step S1710, the transmitting unit 1206 transmits the image data after the image forming data process to the print control unit 906. The print control unit 906 first prints out the image data formed with CMYBk by the determination information. When the printing is completed, the paper is not discharged to the paper discharging mechanism in MFP 101, and at step S1711 MFP 101 automatically sets the paper to the paper feeding step one more. As the method of automatically setting the paper to the paper feeding step, for example, in a reverse path using at double-faced printing, the paper is again set to the paper feeding step without being reversed. Alternatively, alter the printing is completed, the paper is discharged to the paper discharging mechanism in MFP 101 and a display prompting a user to once more set the discharged print paper to the paper feeding step through the UI unit 902 may be made. At step S1712 the transparent form receiving unit 1202 receives the transparent form image data from the memory device 905. Further, when the binary image data in the transparent form image data are required to be reversed from the determination information, the reversing work is also performed. At step S1713, the image forming processing unit 1205 performs the gamma correction process for transparent toner set in MFP to the transparent form image data to perform the image forming process for transparent toner. At step S1714, the transmitting unit 1206 transmits the image data after the image forming process by the transparent toner to the print control unit 906.

The print control unit 906 selects the paper type according to the determination information for the printing out.

According to Embodiment 1, for realizing the effect instructed by a user to the printing portion using the transparent toner, the printing method can be automatically selected. In addition, at the printing, the information on whether the print quality or the print speed is prioritised is in advance set in MFP, and the process can be automatically performed based upon this information.

Embodiment 2

Embodiment 1 has the feature that at the printing, the information on whether the print quality or the print speed is prioritized is in advance set in MFP, and the printing method can be automatically performed based upon, this information. Embodiment 2 has the feature of making a user select the print quality priority or the print speed priority.

Figure 19:
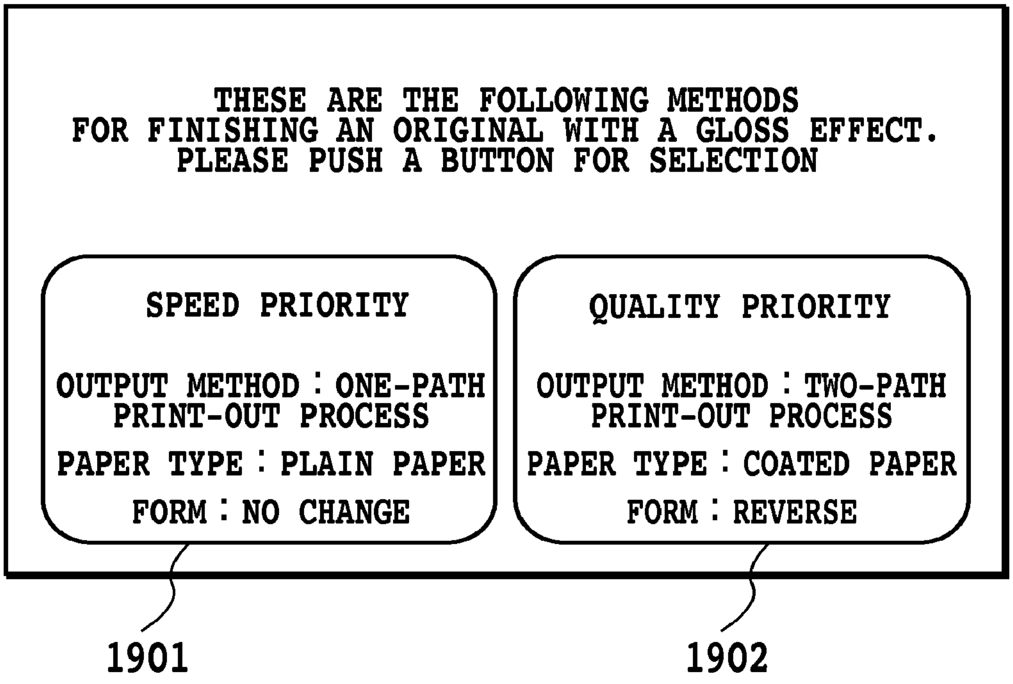
FIG. 19 is a diagram showing an example displayed on the UI screen.

FIG. 19 shows art example of a screen displayed on the local PC screen.

Figure 15:
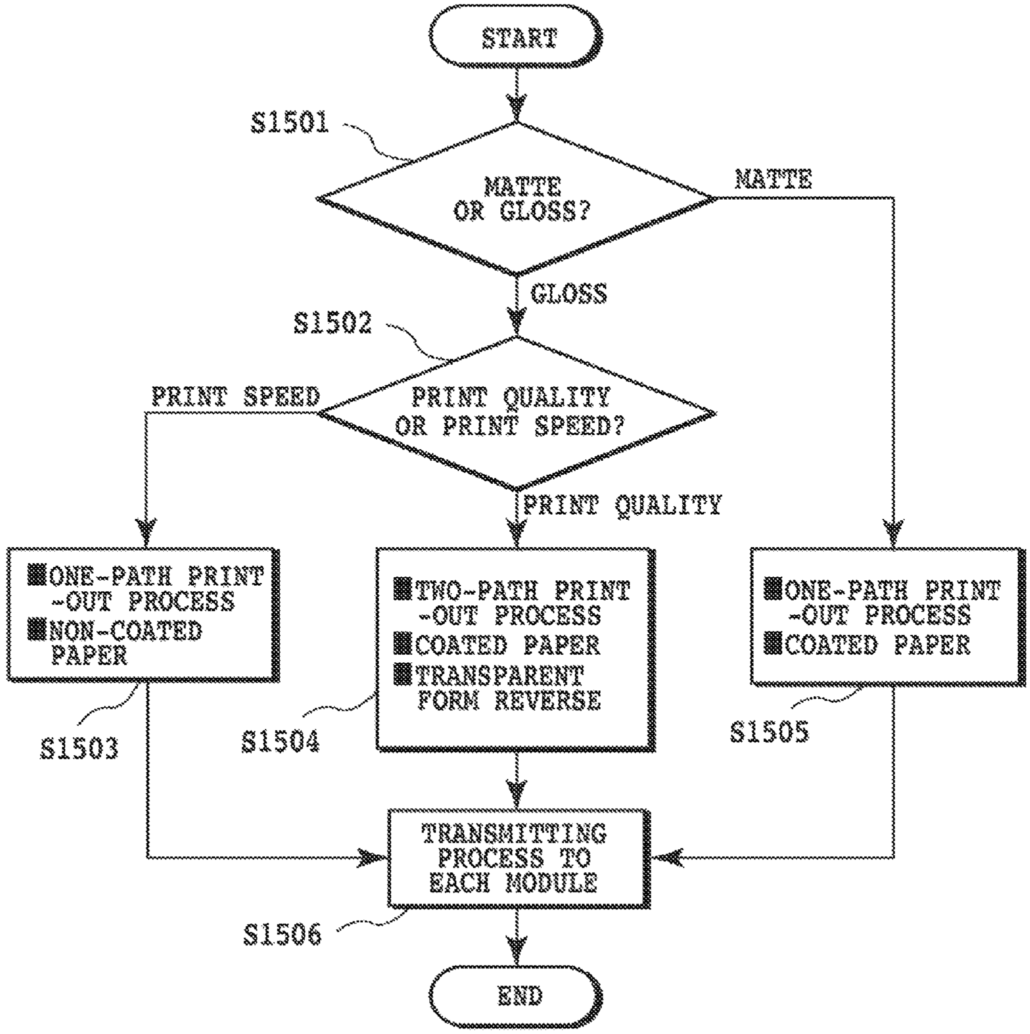
FIG. 15 is a flow chart showing an outline of the present invention.

In step S1502 in FIG. 15, the printer driver UI unit 1802 displays FIG. 19 on the screen of the local PC 102. At that time, the printer driver UI unit 1802 displays selectable priority matters and a print setting in each case on a button. A button 1901 performs an instruction of the print speed priority. In this case the process goes to step S1503. In addition, the printout condition determining unit 903 determines to adopt a one-path print-out process as the printing method and use a non-coated paper as the paper type. In addition, the determination information is generated based upon this result. Then the process goes to step S1506, wherein the determination information is transmitted to the image processing unit 904. On the other hand, a button 1902 performs an instruction of the print quality priority. In this case the process goes to step S1504. In addition, the printout condition determining unit 903 determines to adopt a two-path print-out process as the printing method, use a coated paper as the paper type and reverse transparent form image data. In addition, the determination information is generated based upon this result. Then the process goes to step S1506, wherein the determination information is transmitted to the image processing unit 904.

In Embodiment 2, as described above. In addition to Embodiment 1, a user can select the priority matter, and further, can know a detail of the set matter.

Embodiment 3

In Embodiment 1 and Embodiment 2, the transparent toner is assumed to be printed in the same shape as the image data. On the other hand, Embodiment 3 has the feature that for printing the transparent toner in a shape different from that of the image data, the image data and the transparent form image data (binary image data) are compared, and the determination information is produced based upon an overlap degree thereof.

Figure 20:
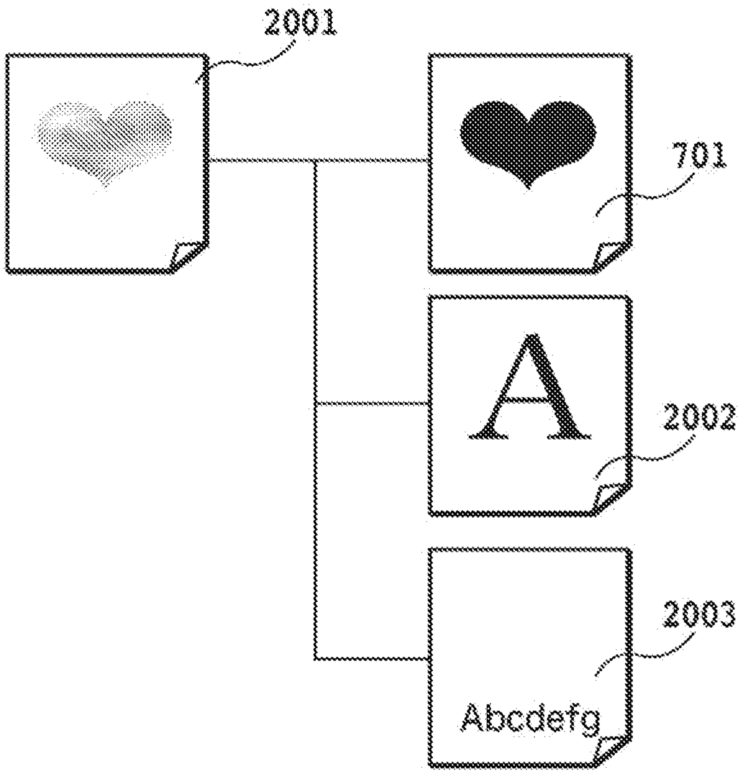
FIG. 20 is a block diagram showing the configuration of transparent form image data.

FIG. 20 is a diagram showing a combination of the image data and the transparent form image data.

Figure 21:
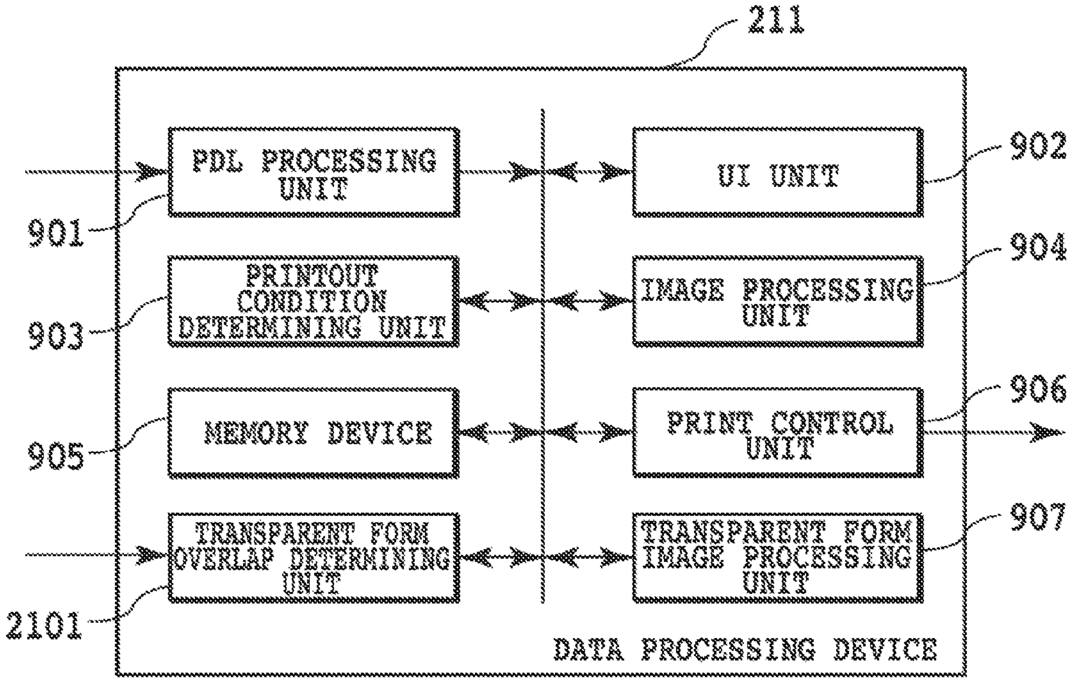
FIG. 21 is a block diagram showing the configuration of the data processing device.

FIG. 21 is a diagram showing the configuration of the data processing unit 211 mounted in MFP and is configured of a transparent form overlap determining unit 2101. The transparent form image data assumed at the time of printing transparent toner on image data 2001 are classified into the following three data. Data 701 in conformity with the image data 2001, data 2002 which mostly overlap with the image data 2001 and data 2003 which do not overlap with the image data 2001 at all can be assumed.

When the printer driver UI unit 1802 instructs the printing rising the transparent form image data, the printer driver UI unit 1802 displays FIG. 8 on the local PC 102. The printer driver UI unit 1802 selects the transparent form image data used at printing from many stored transparent form image data at the selection area 804. Next, an instruction is made on selection of the button 802 and the button 803, and finally according to an instruction of a button 805, the printer driver 1803 produces PDL data, which are transmitted to the transmitting unit 1804. After the PDL processing unit 901 processes the generated PDL data, the generated image data 2001 are transmitted to the transparent form overlap determining unit 2101. Further, foe memory device 905 transmits the selected transparent form image data to the transparent form overlap determining unit 2101.

Figure 22:
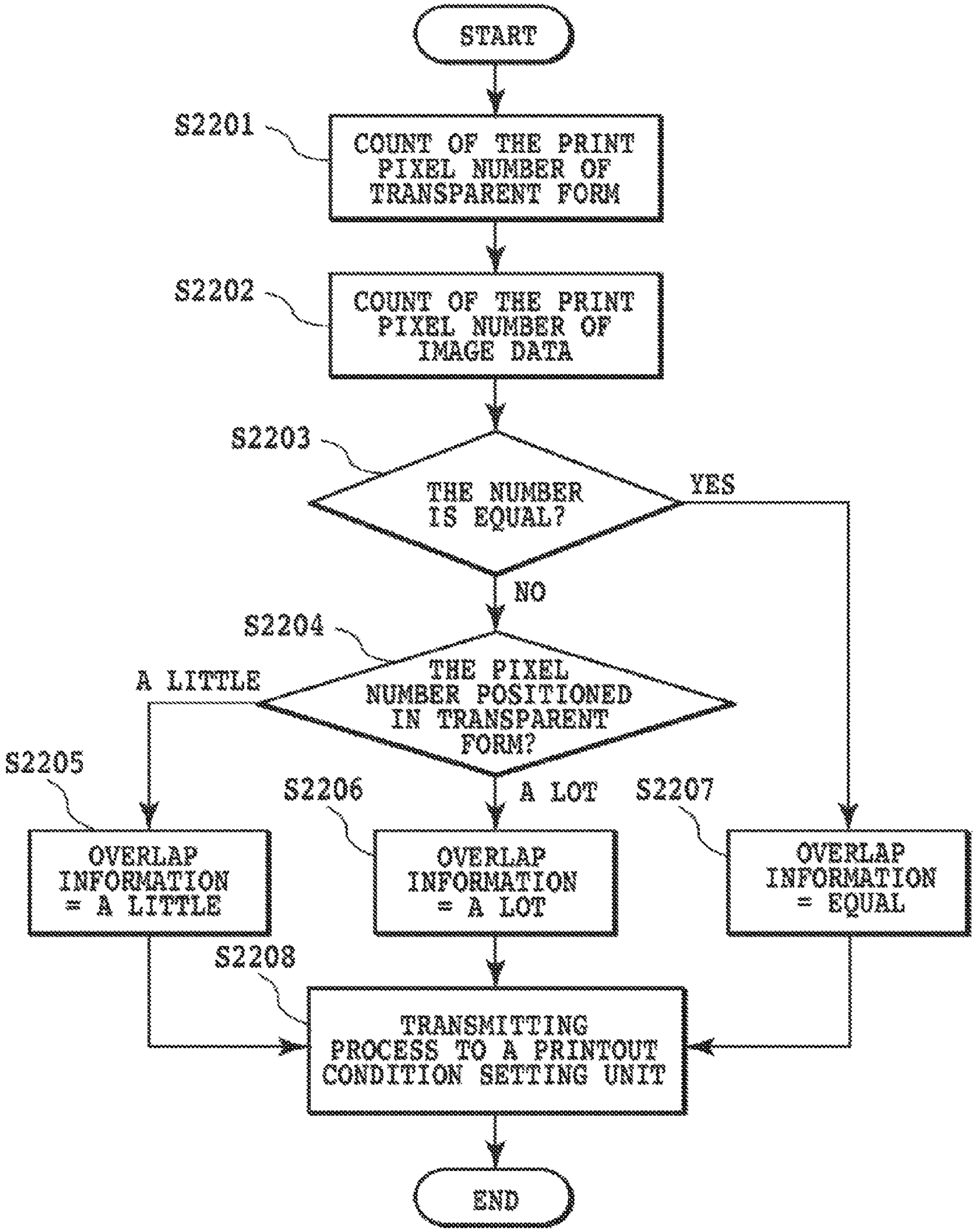
FIG. 22 is a flow chart showing an outline of the present invention.
Figure 24:
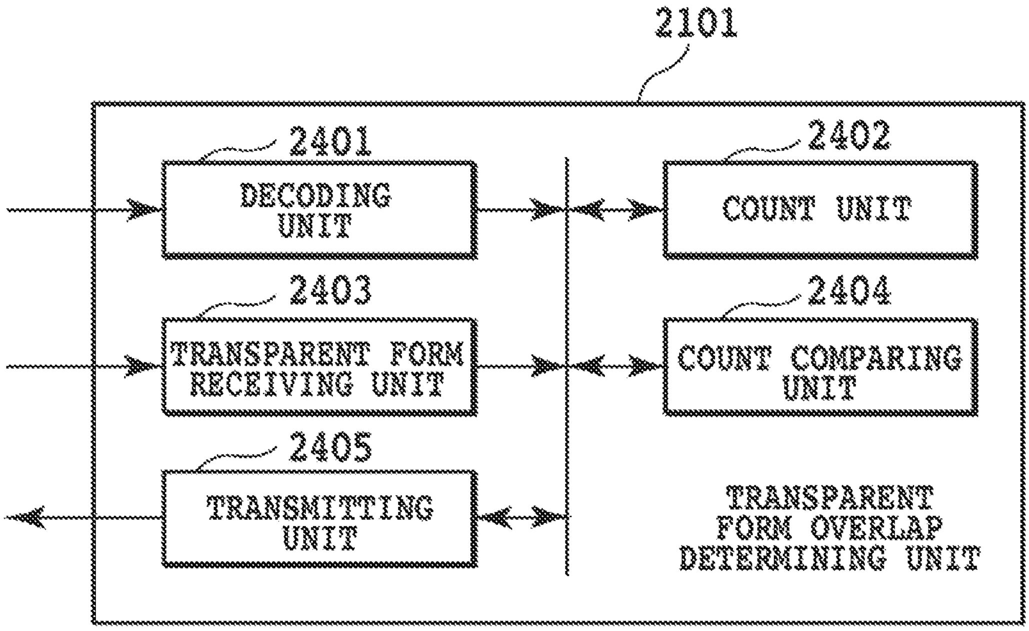
FIG. 24 is a block diagram showing the configuration of a transparent form overlap determining unit.

FIG. 24 is a block, diagram showing the configuration of the transparent form overlap determining unit 2101. An operation flow of the transparent, form overlap determining unit 2101 will be explained with reference to FIG. 22.

At step S2201, the transparent form image data and the image data are received. A count unit 2402 counts the pixel number of pixels in the logical value "1" in the transparent form image data received at the transparent form receiving unit 2403. At step S2202, the transparent form overlap determining unit 2101 counts the pixel number having the color value of the image data, decoded at the decoding unit 2401 by the count unit 2402. At step S2203 a count comparing unit 2404 compares the pixel number of pixels of the logical value "1" counted previously with the pixel number having the color value in the decoded image data. In a case where the results of the comparison are equal, at step S2207 the count comparing rant 2404 determines that the overlap information is equal. In a case where the results of the comparison are not equal, the count comparing unit 2204 compares how much pixels having the color value in the image data have at a position of the pixel in the logical value "1" in the transparent form image data at the count comparing unit 2404. In a case of almost no overlap with the image data 2001 as the transparent form image data 2003, at step S2205 the count comparing unit 2404 determines that the overlap information is "a little". In a case where many portions overlapping with the image data 2001 as the transparent form image data 2002 exist, at step S2206 the count comparing unit 2404 determines that the overlap information is "a lot". At step S2208 the information generated in this way is transmitted to the printout condition determining unit 903 by the transmitting unit 2405.

Figure 23:
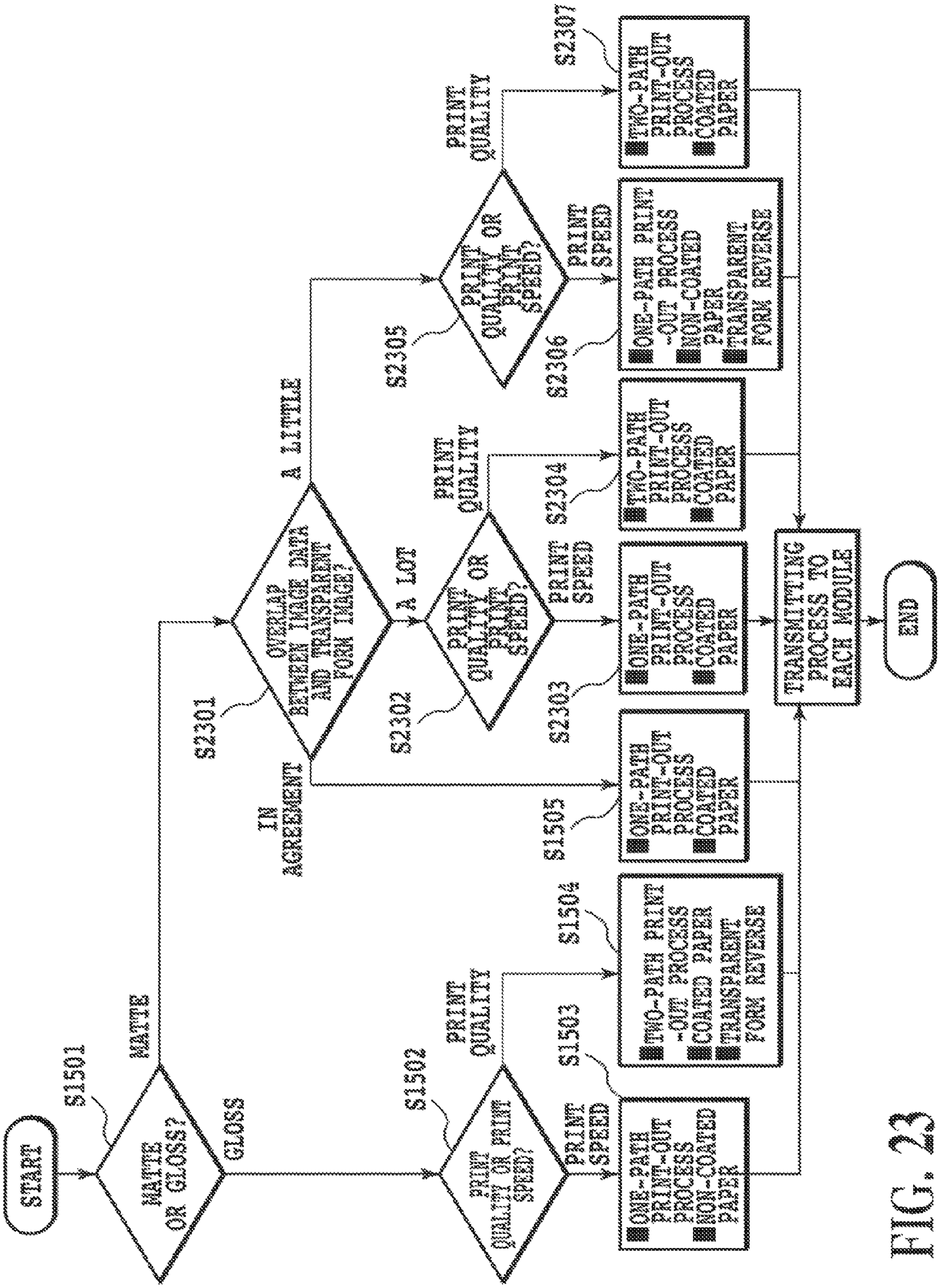
FIG. 23 is a flow chart showing an outline of the present invention.

An operation flow of the printout condition determining unit 903 in the present embodiment will be explained with reference to FIG. 23.

At step S1501, the printout condition determining unit 903 determines whether the print effect information is the matte effect or the gloss effect. In a case where the gloss effect is selected, the process goes to step S1502 in the same way as Embodiment 1. In a case where the matte effect is selected, the process goes to step S2301. In addition, the printout condition determining unit 903 determines the received overlap information. In a case where the overlap information is "equal", the process goes to step S1505 in the same way as Embodiment 1.

In a case where the overlap information is "a lot", the process goes to step S2302, wherein the printout condition determining unit 903 determines the print quality priority or the print speed priority. In a case where it is determined that the print speed priority is selected, the one-path print-out process is, as described above, adopted with priority rather than the two-path, print-out process. In consequence, the one-path print-out process is adopted as the printing method. In addition, it is preferable that a non-coated paper is used as the paper type from a viewpoint of the print speed. However, when the non-coated paper is used in a case where the overlap information is "equal" or "a lot", a defective occurs in printing. For example, for obtaining the effect of "matte" using the non-coated paper, the transparent form is reversed for printing.

In this case, the transparent toner is added to a portion on the non-coated paper with no image data (or a few image data). On the other hand, toner of CMYBk is added to the image data portion. When the CMYBk toner is larger in toner adhesion amount than the transparent toner in the portions where the two kinds of toner are added, the image portion as the portion where the CMYBk toner is added creates rather a glossy feeling. That is, the image portion for desiring to obtain the effect of "matte" creates rather a glossy feeling. Such a defective occurs.

Therefore, the coated paper is determined to be used in a case where the overlap information is "equal" or "a lot" so that in any case, the defective does not occur. The determination information is generated based upon this result. In a case where it is determined that the print quality priority is selected, the two-path print-out process in which a toner adhesion amount, is not limited is adopted as the printing method. Further, the coated paper in which the visual effect more remarkably appears is used ad the paper type. In a case where the overlap information is "a little" at step S2301, at step S2305 the printout condition determining unit 903 determines the print quality priority or the prim speed priority. In a case where it is determined that the print speed priority is selected, the printout condition determining unit 903 adopts the one-path print-out process as the printing method. In a case where the overlap information is "a little", since the defective as shown above does not occur, the non-coated paper of which transportation is faster than the coated paper is determined to be used as the paper type. The determination information is generated based upon this result. In a case where it is determined that the print quality priority is selected, the printout condition determining unit 903 determines to adopt the two-path print-out process as the printing method, use the coated paper as the paper type and reverse the transparent form image data. The determination information is generated based open this result. At step S2308, the determination information is transmitted to the image processing unit 904 and the print control unit 906.

In Embodiment 3 as described above, in addition of Embodiment 1 and Embodiment 2, it is possible to more accurately set the printout condition based upon an overlap degree between the image data and the transparent form, image data. It should be noted that if the instructed effect, or priority can be realized, the printing method may be selected in consideration of an adhesion amount of toner, surface properties of a paper and transparent toner, and a difference component in surface properties between the transparent toner and the toner already printed.

Embodiment 4

In Embodiment 1 and Embodiment 3, the determination information is automatically produced based upon the effect desired by a user and the overlap degree between the image data and the transparent form image data. On the other hand, Embodiment 4 has the feature of automatically determining a control method in a case where a finisher in which a mechanism (hereinafter, referred to as glosser) for enhancing gloss is built is mounted in MFP 101.

The glosser (not shown) is a device in which heat is once more added to the toner once fixed at MFP 101 to melt the surface for the re-fixing. A printout document which has passed the glosser can realise high gloss. That, is, even if the printing is performed at MFP 101 based upon the determination condition set in Embodiment 1 or Embodiment 3 by a user's desire to the matte effect, when the finisher built-in glosser is mounted, it is impossible in realise the matte effect.

Therefore, in Embodiment 4, in a case where the finisher built-in glosser is mounted in MFP 101 and the matte effect is selected, the printout condition determining unit 903 adds to the determination information the printout to a paper discharging opening different from the finisher built-in glosser. The image processing unit 904 and die print control unit 906 receive the determination information.

In Embodiment 4 as described above, in addition of Embodiment 1 and Embodiment 3, even if the finisher built-in glosser is mounted in MFP, it is possible to realise the effect desired by a user.

Embodiment 5

In Embodiment 1 and Embodiment 3, the determination information is automatically produced based upon the effect desired by a user and the overlap degree between the image data and the transparent form image data. On the other hand, Embodiment 5 has the feature of making a user select the effect that a user can print, based upon only the overlap degree between the image data and the transparent form image data.

Figure 25:
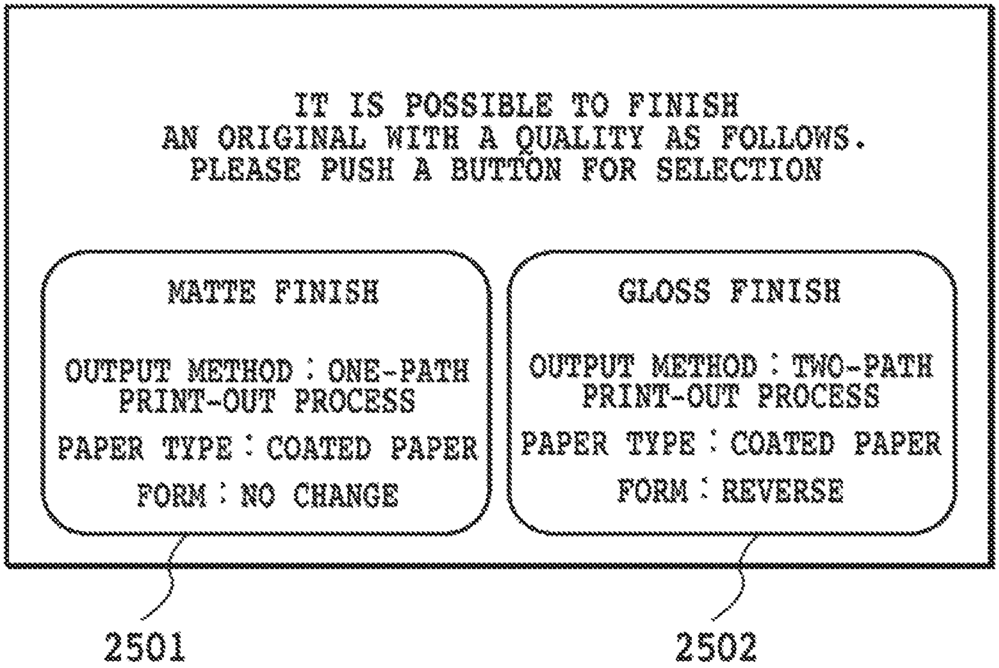
FIG. 25 is a diagram showing an example displayed on the UI screen.

FIG. 25 shows an example of a semen displayed on the local PC screen.

When the printer driver UI unit 1802 instructs the print using the transparent form image data, the printer driver UI unit 1802 displays FIG. 8 on the local PC 102. The printer driver UI unit 1802 selects transparent form image data used at printing from many stored transparent form image data at the selection area 804. Then, the printer driver UI unit 1802 displays the preview 803 on the screen of the local PC 102, thereby making it possible to confirm the binarized transparent form image data. Finally according to an instruction of the button 805, the printer driver 1803 produces PDL data, which are transmitted to the transmitting unit 1804.

The printout condition determining unit 903 generates the determination information only by determining the priority matter in advance set at MFP 101. The generated determination information is displayed on the local PC screen in FIG. 25, and a user can select the print effect. For example, a button 2501 instructs the printout with a matte effect, and the setting at that time also displays that the printing method is a one-path print-out process and the paper is a coated paper. In addition, a button 2502 instructs the printing with a gloss effect, and also displays that the printing method is the one-path print-out process, the paper is the coated, paper and the transparent form image data are reversed. According to the instruction of either of the buttons, the image processing unit 904 and the print control unit 906 receive the determination information.

In Embodiment 5 as described above, since the effect accomplished by printing is displayed, the print effect can be simply realised only by a user's selection without paying attention to the print effect particularly.

Embodiment 6

In Embodiment 1 and Embodiment 3, the determination information is automatically produced based upon the effect desired by a user and the overlap degree between the image data and the transparent form image data. On the other hand, Embodiment 6 has the feature of displaying to a user a measurement method when the limit to the paper type occurs.

A printing operation is started based upon the determination information automatically produced from die effect desired by a user and the overlap degree between the image data and the transparent form image data, but although the paper type of the determination information is the coated paper, the coated paper may not be mounted. On that occasion, the printer driver UI unit 1802 displays a screen of informing a user of mounting the coated paper on the screen of the local PC 102. Alternatively, the printer driver UI unit 1802 displays a screen of providing a user with a warning that the mounted paper type is used as an alternative but the print effect, may not live up to the user's expectations, on the screen of the local PC 102 (not shown).

In addition, in a case where the paper type which a user desires to print is mounted, the printout condition determining unit 903 determines whether or not a desired (given) print effect can be produced with the paper type. In a case where the desired print effect can not be produced, the printer driver UI unit 1802 displays a warning screen that the print effect may not live up to the expectations, on the screen of the local PC 102 (not shown).

In Embodiment 6 as described above, it is possible to prompt a user to perform a measurement in a case where the paper type with which the desired effect can be obtained is not mounted.

Embodiment 7

In Embodiment 1 and Embodiment 3, the determination information is automatically produced based upon the effect desired by a user and the overlap degree between the image data and the transparent form image data. On the other hand, Embodiment 7 has the feature of automatically producing the determination information in a case where transparent toner is used to a printout document already printed to realize the print effect. In this case, a transparent image having a configuration corresponding to that of the printout document already printed is added to the printout document.

Figure 26:
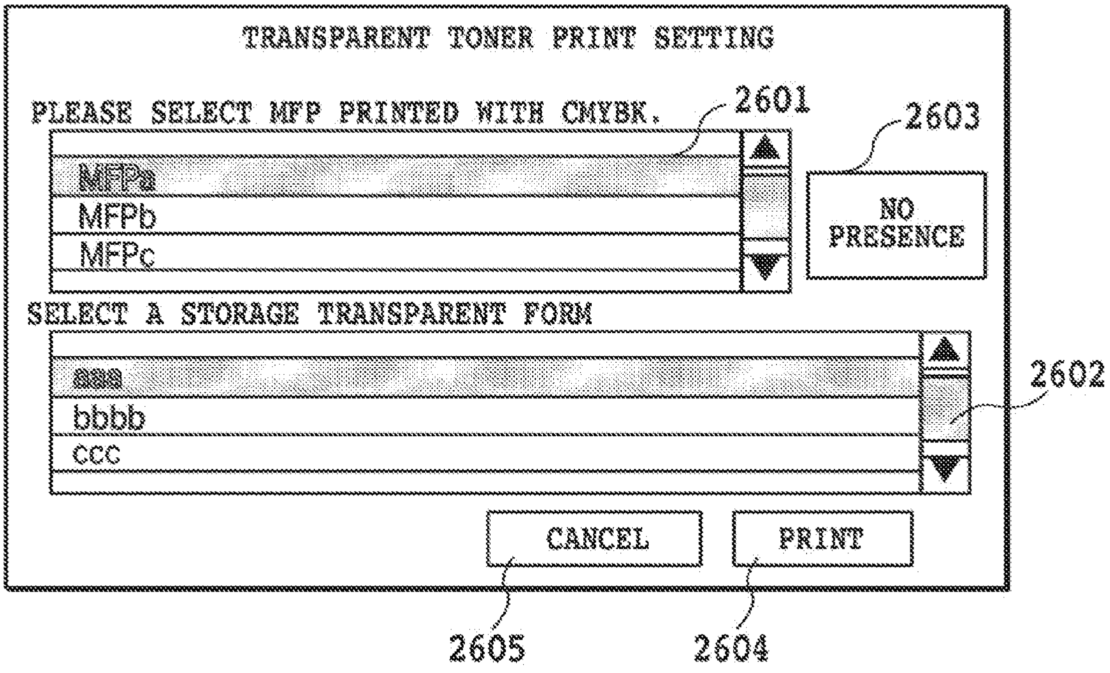
FIG. 26 is a diagram showing an example displayed on the UI screen.
Figure 27:
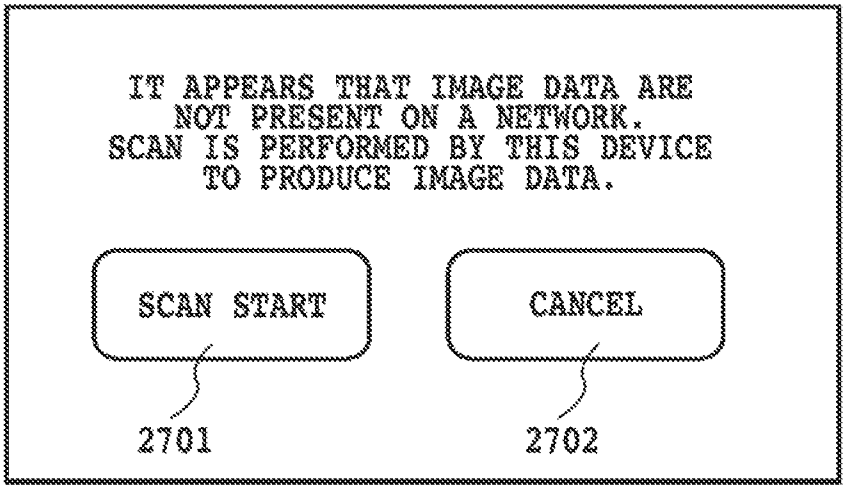
FIG. 27 is a diagram showing an example displayed on the UI screen.

FIG. 26 and FIG. 27 are diagrams each showing an example displayed on the screen of the UI unit 902 in MFP 101.

Figure 28:
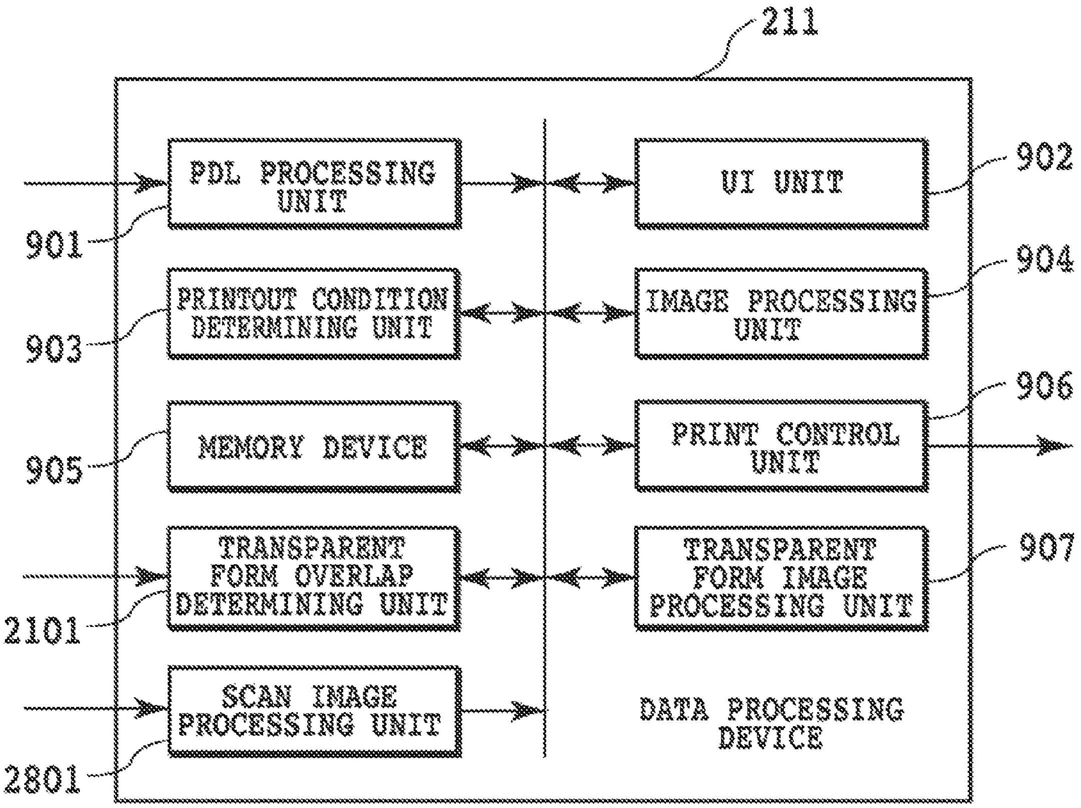
FIG. 28 is a block diagram showing the configuration of the data processing device.

FIG. 28 is a diagram showing the configuration of the data processing device 211 mounted in MFP 101 and is configured of a scan image processing unit 2801.

First, MFP 103 performs printing with four colors of CMYBk. At that time, MFP 103 performs a gray scale process and binarization to the generated image data, which are stored in the memory device built in MFP 103. The paper feeding step in MFP 101 sets the printout document discharged from the MFP 103. Then, the UI unit 902 in MFP 101 displays a screen of FIG. 26 on a control panel (not shown) in MFP 101. The UI unit 902 displays a list of MFP connected to LAN 104 in the same as MFP 101 to select MFP 103 which has performed the priming with four colors of CMYBk from a selection area 2601. When the UI unit 902 selects MFP 103, at the selection area 2602 there is selected an image corresponding to the printout document set to the paper feeding step from the binarized images stored, in the memory device built in MFP 103. According to an instruction of a button 2604, the UNI unit 902 determines selection of form images and selection of print effects at MFP 101. An instruction of a button 2605 means cancellation. The transparent form overlap determining unit 2101 receives the binarized image data from MFP 103 when the selection of the transparent form image data and the selection of the print effects at MFP 101 by the UI unit 902 are completed and the printing operation is started. The transparent form overlap determining unit 2101 makes the determination using the binarized image data and the selected transparent form image data.

Next, in a case where MFP 105 which is not connected to LAN 104 performs four-color printing, the UI unit 902 does not display MFP 105 on the selection area 2601. According to an instruction of a button 2403, the UI unit 902 displays FIG. 27 on the control panel of the MFP 101. An original reading device of MFP 101 sets the printout document printed in four colors and reads the printout document printed in four colors according to an instruction of a button 2701, which is obtained as image data. The scan image processing unit 2801 performs an image process for scan (color process, base removing or the like) to the obtained image data, which are transmitted to the transparent form overlap determining unit 2101. An instruction of a button 2702 means cancellation of the reading-in operation.

The UI unit 902 in MFP 101 selects the transparent form, image data from the selection area 804 on the screen of FIG. 8 displayed on the control panel by the UI unit 902, selects the print effect from the button 801 and the button 802 and starts with a printing operation according to the instruction of the button 805. First the overlap form determining unit 2101 determines the overlap degree between the image data and the transparent form image data.

After determining the overlap degree, even if the printing by four colors of CMYBk is performed by either one of MFP 103 and MFP 105, the printout condition determining unit 903 generates the determination information. As candidates in this case, since Embodiment 7 performs the priming by the two-path print-out process, only step S1504, step S2304, and step S2307 can be selected.

Figure 29:
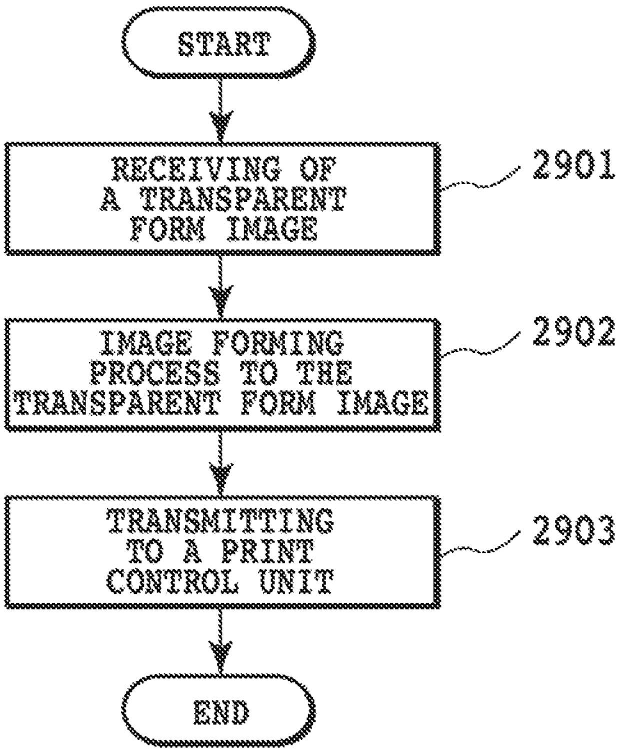
FIG. 29 is a flow chart showing an outline of the present invention.

An operation flow of the image processing unit 904 in the present embodiment will be explained with reference to FIG. 29.

At step S2901, the transparent form receiving unit 1202 receives the selected transparent form image data from the memory device 905. Further, in a case where the binary image data in the transparent form image data are required to be reversed from the determination information, the reverse work is also carried out. At step S2902, the image forming processing unit 1205 performs an image forming process to the transparent form image data. At step S2903, the transmitting unit 1206 transmits the image data to the print control unit 906.

In Embodiment 7 as described above, in addition to Embodiment 1 and Embodiment 3, it is possible to realize the print effect to the printout document already printed.

In all the embodiments other than Embodiment 7, the output by PDL is described, but the present invention is not limited thereto. The same can be applied to the output by scan. In this case, after the process is performed at the image processing unit 2801 for scan, an operation similar to that of PDL is performed. The screen displayed on the screen of the local PC 102 is displayed on the screen of the control panel in MFP 101.

Other Embodiments

The scope of the aforementioned embodiment also includes a processing method in which a program for operating the configuration of the above embodiment so as to realise the function of the above embodiment is stored in a recording medium and the program stored in the recording medium is read out as a code, which is performed by a computer.

Aspects of the present invention can also be realised by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

The recording medium is a computer readable recording medium. In addition, not only the recording medium in which the above program is stored but also the program itself can be included in the aforementioned embodiment.

An example of such a recording medium may include a floppy (registered trademark) disc, a hard disc, an optical disc, an optical, magnetic disc, CD-ROM, a magnetic tape, an involatile memory card and ROM.

The embodiment includes not only the device of performing the process with the program unit stored in the aforementioned recording medium, but also a device which operates in operational sequence in cooperation with the other software and a function of an expansion board to perform the operation of the aforementioned embodiment.

While the present invention has been described with reference to exemplary embodiments, it is to be understood that the technical scope of the invention is not limited to that of the disclosed embodiments. It is apparent for persons skilled in the art to be capable of adding various modifications and improvements to the embodiments. It is apparent from the description of the claims that embodiments with such modifications or improvements are also included in the technical scope of the present invention.

The invention claimed is:

1. An image forming device comprising:

a first receiving unit configured to receive an image to be printed using transparent toner;

a second receiving unit configured to receive an instruction specifying either gloss effect or matte effect which is realized using the transparent toner for the image received by the first receiving unit; and an image forming unit configured to form an image using the transparent toner on non-coated paper based on the image received by the first receiving unit in a case where the instruction received by the second receiving unit specifies the gloss effect, and form an image using the transparent toner on coated paper based on the image received by the first receiving unit in a case where the instruction received by the second receiving unit specifies the matte effect.

2. An image forming system comprising an information processing device and an image forming device connected with the information processing device, the image forming system comprising:

a selecting unit configured to select an image to be printed using transparent toner;

an instructing unit configured to specify either gloss effect or matte effect which is realized by using the transparent toner for the image selected by the selecting unit; and an image forming unit configured to form an image using the transparent toner on non-coated paper based on the image selected by the selecting unit in a case where the effect specified by the instruction unit is the gloss effect, and form an image using the transparent toner on coated paper based on the image selected by the selecting unit in a case where the effect specified by the instruction unit is the matte effect.

3. The image forming system according to claim 2, further comprising a storage unit configured to store the image to be printed using the transparent toner.

4. The image forming system according to claim 2, further comprising a displaying unit configured to display the image to be printed using the transparent toner selected by the selecting unit.

5. An image forming method comprising:

receiving an image to be printed using transparent toner;

receiving an instruction specifying either gloss effect or matte effect which is realized by using the transparent toner for the received image; and forming an image using the transparent toner on non-coated paper based on the received image in a case where the received instruction specifies the gloss effect; and forming an image using the transparent toner on coated paper based on the received image in a case where the received instruction specifies the matte effect.

* * * * *